US 9,647,997 B2

(12) United States Patent
Perrine et al.

(10) Patent No.: US 9,647,997 B2
(45) Date of Patent: *May 9, 2017

(54) USB INTERFACE FOR PERFORMING TRANSPORT I/O

(71) Applicant: NagraStar, LLC, Englewood, CO (US)

(72) Inventors: Jerome Perrine, Romanel sur Morges (CH); Hervé Goupil, Villars-sous-Yens (CH); Maurice Gerard van Riek, Belmont-sur-Lausanne (CH); William Michael Beals, Englewood, CO (US); Nicolas Fischer, Versoix (CH); Benjamin Brian Ellis, Denver, CO (US); Gregory Duval, Englewood, CO (US)

(73) Assignee: NagraStar, LLC, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/608,900

(22) Filed: Jan. 29, 2015

(65) Prior Publication Data

US 2015/0143105 A1 May 21, 2015

Related U.S. Application Data

(63) Continuation-in-part of application No. 13/799,891, filed on Mar. 13, 2013.
(Continued)

(51) Int. Cl.
*H04N 21/24* (2011.01)
*H04L 29/06* (2006.01)
(Continued)

(52) U.S. Cl.
CPC .......... *H04L 63/0471* (2013.01); *H04L 9/065* (2013.01); *H04L 63/0853* (2013.01);
(Continued)

(58) Field of Classification Search
None
See application file for complete search history.

(56) References Cited

U.S. PATENT DOCUMENTS

| D54,610 S | 3/1920 | Evans et al. |
|---|---|---|
| 3,702,025 A | 11/1972 | Archer |

(Continued)

FOREIGN PATENT DOCUMENTS

| CA | 2318936 | 4/2004 |
|---|---|---|
| EP | 0740478 | 10/1996 |

(Continued)

OTHER PUBLICATIONS

U.S. Appl. No. 29/448,766, Notice of Allowance mailed Apr. 22, 2015, 5 pages.

(Continued)

*Primary Examiner* — Cai Chen

(57) ABSTRACT

Systems and methods for implementing a Transport I/O system are described. Network encrypted content may be received by a device. The device may provide the network encrypted content to a secure processor, such as, for example, a smart card. The secure processor obtains a network control word that may be used to decrypt the network encrypted content. The secure processor may decrypt the network encrypted content to produce clear content. In embodiments, the secure processor may then use a local control word to generate locally encrypted content specific to the device. The device may then receive the locally encrypted content from the secure processor and proceed to decrypt the locally encrypted content using a shared local encryption key. The secure processor may connect to the device via a standard connection, such as via a USB 3.0 connector.

20 Claims, 17 Drawing Sheets

Related U.S. Application Data

(60) Provisional application No. 62/048,142, filed on Sep. 9, 2014.

(51) Int. Cl.

| | | |
|---|---|---|
| *H04N 21/234* | (2011.01) | |
| *H04N 21/418* | (2011.01) | |
| *H04N 21/435* | (2011.01) | |
| *H04N 21/4385* | (2011.01) | |
| *H04N 21/44* | (2011.01) | |
| *H04N 21/4405* | (2011.01) | |
| *H04N 21/647* | (2011.01) | |
| *H04N 21/266* | (2011.01) | |
| *H04L 9/06* | (2006.01) | |

(52) U.S. Cl.
CPC ... *H04N 21/23406* (2013.01); *H04N 21/2401* (2013.01); *H04N 21/26606* (2013.01); *H04N 21/26613* (2013.01); *H04N 21/4181* (2013.01); *H04N 21/4353* (2013.01); *H04N 21/43853* (2013.01); *H04N 21/44004* (2013.01); *H04N 21/4405* (2013.01); *H04N 21/64715* (2013.01); *H04L 2209/60* (2013.01)

(56) References Cited

U.S. PATENT DOCUMENTS

| | | |
|---|---|---|
| 4,104,785 A | 8/1978 | Shiba et al. |
| D267,094 S | 11/1982 | Doi |
| 4,394,654 A | 7/1983 | Hofmann-Cerfontaine |
| 4,417,413 A | 11/1983 | Hoppe et al. |
| 4,532,419 A | 7/1985 | Takeda |
| 4,549,200 A | 10/1985 | Ecker et al. |
| 4,549,247 A | 10/1985 | Hoppe et al. |
| 4,575,621 A | 3/1986 | Dreifus |
| 4,600,257 A | 7/1986 | Fushimoto |
| 4,603,249 A | 7/1986 | Hoppe et al. |
| 4,614,861 A | 9/1986 | Pavlov et al. |
| 4,639,585 A | 1/1987 | Haghiri-Tehrani et al. |
| 4,677,529 A | 6/1987 | Watanabe et al. |
| 4,689,103 A | 8/1987 | Elarde |
| 4,696,034 A | 9/1987 | Wiedemer |
| 4,727,246 A | 2/1988 | Hara et al. |
| 4,774,633 A | 9/1988 | Dehaine et al. |
| 4,792,843 A | 12/1988 | Haghiri-Tehrani et al. |
| 4,795,895 A | 1/1989 | Hara et al. |
| 4,797,542 A | 1/1989 | Hara |
| 4,803,542 A | 2/1989 | Haghiri-Tehrani et al. |
| 4,814,943 A | 3/1989 | Okuaki |
| 4,822,989 A | 4/1989 | Miyamoto et al. |
| 4,825,283 A | 4/1989 | Shino |
| 4,835,846 A | 6/1989 | Juan et al. |
| 4,849,944 A | 7/1989 | Matsushita |
| 4,868,376 A | 9/1989 | Lessin et al. |
| D304,826 S | 11/1989 | Sutoh |
| D305,023 S | 12/1989 | Suto |
| 4,887,234 A | 12/1989 | Iijima |
| 4,889,980 A | 12/1989 | Hara et al. |
| 4,897,534 A | 1/1990 | Haghiri-Tehrani |
| 4,980,802 A | 12/1990 | Champagne et al. |
| 4,985,920 A | 1/1991 | Seki |
| 5,027,190 A | 6/1991 | Haghiri-Tehrani et al. |
| 5,031,026 A | 7/1991 | Ueda |
| 5,049,718 A | 9/1991 | Spletter et al. |
| 5,055,913 A | 10/1991 | Haghiri-Tehrani |
| 5,097,117 A | 3/1992 | Champagne et al. |
| 5,126,548 A | 6/1992 | Sekiguchi |
| D327,883 S | 7/1992 | Gloton |
| D328,599 S | 8/1992 | Gloton |
| 5,134,773 A | 8/1992 | LeMaire et al. |
| 5,155,068 A | 10/1992 | Tada |
| 5,203,078 A | 4/1993 | Nakanishi et al. |
| 5,208,450 A | 5/1993 | Uenishi et al. |
| 5,220,598 A | 6/1993 | Böck |
| 5,250,341 A | 10/1993 | Kobayashi et al. |
| D342,728 S | 12/1993 | Gloton |
| 5,276,311 A | 1/1994 | Hennige |
| 5,276,317 A | 1/1994 | Ozouf et al. |
| D344,502 S | 2/1994 | Gloton |
| 5,304,513 A | 4/1994 | Haghiri-Tehrani et al. |
| 5,361,062 A | 11/1994 | Weiss et al. |
| 5,362,955 A | 11/1994 | Haghiri-Tehrani |
| 5,363,279 A | 11/1994 | Cha |
| D353,135 S | 12/1994 | Gloton |
| D353,136 S | 12/1994 | Gloton |
| 5,375,037 A | 12/1994 | Le Roux |
| 5,386,340 A | 1/1995 | Kurz |
| D357,909 S | 5/1995 | Gloton |
| D358,142 S | 5/1995 | Gloton |
| 5,444,301 A | 8/1995 | Song et al. |
| 5,448,511 A | 9/1995 | Paurus et al. |
| 5,463,210 A | 10/1995 | Imura |
| 5,486,687 A | 1/1996 | Le Roux |
| 5,526,233 A | 6/1996 | Hayakawa |
| 5,543,585 A | 8/1996 | Booth et al. |
| 5,544,014 A | 8/1996 | Atsumi |
| 5,563,400 A | 10/1996 | Le Roux |
| D375,303 S | 11/1996 | Gaumet |
| 5,581,065 A | 12/1996 | Nishikawa et al. |
| 5,615,085 A | 3/1997 | Wakabayashi et al. |
| 5,623,552 A | 4/1997 | Lane |
| 5,637,858 A | 6/1997 | Hoppe et al. |
| 5,655,917 A | 8/1997 | Kaneshige et al. |
| 5,677,524 A | 10/1997 | Haghiri-Tehrani |
| D387,746 S | 12/1997 | Ishihara |
| D387,747 S | 12/1997 | Ishihara |
| D388,066 S | 12/1997 | Ishihara |
| D389,130 S | 1/1998 | Ishihara |
| 5,724,545 A | 3/1998 | Skorski |
| 5,729,000 A | 3/1998 | Sugimoto |
| 5,739,515 A | 4/1998 | Takemura |
| 5,742,680 A | 4/1998 | Wilson |
| 5,745,988 A | 5/1998 | Hohmann et al. |
| 5,752,857 A | 5/1998 | Knights |
| 5,780,836 A | 7/1998 | Iguchi et al. |
| 5,780,837 A | 7/1998 | Garcia |
| 5,789,733 A | 8/1998 | Jachimowicz et al. |
| 5,822,190 A | 10/1998 | Iwasaki |
| 5,852,290 A | 12/1998 | Chaney |
| D407,392 S | 3/1999 | Kleineidam |
| 5,877,488 A | 3/1999 | Klatt et al. |
| 5,877,975 A | 3/1999 | Jigour et al. |
| 5,932,866 A | 8/1999 | Terada et al. |
| 5,933,328 A | 8/1999 | Wallace et al. |
| 5,955,961 A | 9/1999 | Wallerstein |
| 5,991,400 A | 11/1999 | Kamperman |
| 5,993,261 A | 11/1999 | Klatt et al. |
| 6,025,997 A | 2/2000 | Huber et al. |
| 6,027,028 A | 2/2000 | Pieterse et al. |
| 6,035,037 A | 3/2000 | Chaney |
| 6,036,099 A | 3/2000 | Leighton |
| 6,054,774 A | 4/2000 | Ohmori et al. |
| D425,519 S | 5/2000 | Merlin et al. |
| 6,065,681 A | 5/2000 | Trueggelmann |
| 6,097,605 A | 8/2000 | Klatt et al. |
| 6,102,743 A | 8/2000 | Haffenden et al. |
| 6,141,210 A | 10/2000 | Iwasaki |
| D434,396 S | 11/2000 | Iwasaki |
| D434,418 S | 11/2000 | Shinada |
| 6,151,511 A | 11/2000 | Cruciani |
| 6,188,580 B1 | 2/2001 | Huber et al. |
| 6,191,951 B1 | 2/2001 | Houdeau et al. |
| 6,209,790 B1 | 4/2001 | Houdeau et al. |
| 6,213,403 B1 | 4/2001 | Bates, III |
| 6,241,557 B1 | 6/2001 | Reichardt |
| 6,292,490 B1 | 9/2001 | Gratacap et al. |
| 6,315,205 B1 | 11/2001 | Bates, III |
| 6,329,228 B1 | 12/2001 | Terashima |
| D452,864 S | 1/2002 | Wallace et al. |
| 6,344,162 B1 | 2/2002 | Miyajima |
| D456,414 S | 4/2002 | Turin |
| 6,369,795 B1 | 4/2002 | Lester et al. |
| 6,378,774 B1 | 4/2002 | Emori et al. |

(56) References Cited

U.S. PATENT DOCUMENTS

| | | |
|---|---|---|
| 6,398,114 B1 | 6/2002 | Nishikawa et al. |
| 6,409,089 B1 | 6/2002 | Eskicioglu |
| 6,443,361 B1 | 9/2002 | Klatt et al. |
| 6,460,772 B1 | 10/2002 | Stahl |
| 6,492,718 B2 | 12/2002 | Ohmori |
| 6,548,888 B1 | 4/2003 | Fidalgo et al. |
| 6,561,432 B1 | 5/2003 | Vedder et al. |
| 6,581,840 B2 | 6/2003 | Takeda et al. |
| 6,592,031 B1 | 7/2003 | Klatt |
| 6,592,044 B1 | 7/2003 | Wong et al. |
| 6,594,361 B1 | 7/2003 | Chaney et al. |
| 6,641,049 B2 | 11/2003 | Luu |
| 6,646,957 B2 | 11/2003 | Martin et al. |
| D487,747 S | 3/2004 | Yu et al. |
| 6,705,520 B1 | 3/2004 | Pitroda et al. |
| 6,719,206 B1 | 4/2004 | Bashan et al. |
| D491,951 S | 6/2004 | Yu et al. |
| D492,688 S | 7/2004 | Wallace et al. |
| 6,764,005 B2 | 7/2004 | Cooper |
| D493,798 S | 8/2004 | Yu et al. |
| 6,779,115 B1 | 8/2004 | Naim |
| 6,811,082 B2 | 11/2004 | Wong |
| 6,826,185 B1 | 11/2004 | Montanaro et al. |
| 6,848,617 B1 | 2/2005 | Fries et al. |
| 6,882,541 B2 | 4/2005 | Maruyama et al. |
| 6,896,189 B2 | 5/2005 | Guion et al. |
| 6,922,780 B1 | 7/2005 | Siegel |
| 6,974,343 B2 | 12/2005 | Zheng et al. |
| 7,019,981 B2 | 3/2006 | Heinemann et al. |
| 7,051,128 B2 | 5/2006 | Bando |
| 7,051,929 B2 | 5/2006 | Li |
| 7,062,584 B1 | 6/2006 | Worrell et al. |
| 7,063,267 B2 | 6/2006 | Tsuchimoto |
| 7,136,514 B1 | 11/2006 | Wong |
| 7,140,550 B2 | 11/2006 | Ramachandran |
| 7,184,093 B2 | 2/2007 | Manning |
| 7,225,537 B2 | 6/2007 | Reed |
| 7,252,242 B2 | 8/2007 | Ho |
| 7,294,918 B2 | 11/2007 | Wada et al. |
| 7,305,535 B2 | 12/2007 | Harari et al. |
| 7,350,714 B2 | 4/2008 | Wallace et al. |
| D571,810 S | 6/2008 | Ikeda |
| 7,384,294 B2 | 6/2008 | Washino et al. |
| 7,416,132 B2 | 8/2008 | Takiar et al. |
| 7,469,420 B2 | 12/2008 | Duffield et al. |
| 7,485,501 B2 | 2/2009 | Takiar et al. |
| D588,133 S | 3/2009 | Nakamura |
| D588,134 S | 3/2009 | Nakamura |
| 7,508,942 B2 | 3/2009 | Candelore |
| 7,520,052 B2 | 4/2009 | Takahashi et al. |
| 7,530,495 B2 | 5/2009 | Cooper |
| 7,552,876 B2 | 6/2009 | Nishizawa et al. |
| 7,559,469 B2 | 7/2009 | Noda et al. |
| 7,577,846 B2 | 8/2009 | Kudelski et al. |
| 7,605,453 B2 | 10/2009 | Stampka et al. |
| 7,647,641 B2 | 1/2010 | Dubroeucq et al. |
| 7,659,606 B2 | 2/2010 | Klatt |
| 7,673,805 B2 | 3/2010 | Onishi et al. |
| 7,784,693 B2 | 8/2010 | Liao et al. |
| 7,793,848 B2 | 9/2010 | Abe et al. |
| 7,810,718 B2 | 10/2010 | Bonneau et al. |
| 7,828,207 B2 | 11/2010 | Cooper |
| 7,864,540 B2 | 1/2011 | Takiar |
| 7,871,007 B2 | 1/2011 | Amiot et al. |
| 7,871,011 B2 | 1/2011 | Reignoux et al. |
| 7,913,916 B2 | 3/2011 | Musial et al. |
| 7,922,097 B2 | 4/2011 | Yoshikawa et al. |
| 7,925,016 B2 | 4/2011 | Candelore |
| 7,954,705 B2 | 6/2011 | Mullen et al. |
| D643,040 S | 8/2011 | Sedio et al. |
| 8,009,432 B2 | 8/2011 | Su et al. |
| 8,022,526 B2 | 9/2011 | Chall et al. |
| 8,064,205 B2 | 11/2011 | Farhan et al. |
| 8,079,528 B2 | 12/2011 | Song |
| D667,442 S | 9/2012 | Phelan |
| D669,478 S | 10/2012 | Lepp et al. |
| D669,479 S | 10/2012 | Lepp et al. |
| 8,317,103 B1 | 11/2012 | Foo et al. |
| D681,640 S | 5/2013 | Aoki et al. |
| 8,451,122 B2 | 5/2013 | Narendra et al. |
| 8,456,850 B2 | 6/2013 | Kang et al. |
| 8,456,852 B2 | 6/2013 | Xiao et al. |
| D685,375 S | 7/2013 | Steinberger |
| D686,214 S | 7/2013 | Maus et al. |
| 8,480,002 B2 | 7/2013 | Poidomani et al. |
| 8,490,127 B2 | 7/2013 | Vantalon et al. |
| 8,500,019 B2 | 8/2013 | Poidomani et al. |
| 8,505,064 B2 * | 8/2013 | Hildebrand ........ H04N 7/17309 725/132 |
| D695,636 S | 12/2013 | Mullen et al. |
| 8,608,082 B2 | 12/2013 | Le Garrec et al. |
| 8,618,669 B2 | 12/2013 | Furuta |
| 8,647,110 B2 | 2/2014 | Choi et al. |
| 8,649,820 B2 | 2/2014 | Schwandt et al. |
| 8,654,535 B2 | 2/2014 | Lin et al. |
| D701,864 S | 4/2014 | Lepp et al. |
| D702,240 S | 4/2014 | Lepp et al. |
| D702,241 S | 4/2014 | Lepp et al. |
| D703,208 S | 4/2014 | Lepp et al. |
| 8,690,283 B2 | 4/2014 | Pomerantz et al. |
| 8,700,833 B2 | 4/2014 | Cedar et al. |
| 8,730,009 B2 | 5/2014 | Barry |
| D707,682 S | 6/2014 | Florek et al. |
| 8,746,579 B1 | 6/2014 | Cloutier et al. |
| 8,814,053 B2 | 8/2014 | Narendra et al. |
| 8,936,199 B2 | 1/2015 | Lepp et al. |
| D729,808 S | 5/2015 | Beals et al. |
| D758,372 S | 6/2016 | Beals et al. |
| D759,022 S | 6/2016 | Beals et al. |
| 2001/0011944 A1 | 8/2001 | Garrido-Gadea et al. |
| 2001/0012366 A1 | 8/2001 | Van Rijnsoever et al. |
| 2001/0018984 A1 | 9/2001 | Takeda et al. |
| 2001/0050846 A1 | 12/2001 | Cho |
| 2002/0003168 A1 | 1/2002 | Takabayashi |
| 2002/0137502 A1 | 9/2002 | Cronin et al. |
| 2002/0145049 A1 | 10/2002 | Lasch et al. |
| 2003/0002577 A1 | 1/2003 | Pinder |
| 2003/0059047 A1 * | 3/2003 | Iwamura ................ H04N 7/163 380/201 |
| 2003/0085287 A1 | 5/2003 | Gray |
| 2003/0091160 A1 | 5/2003 | Enbom et al. |
| 2003/0153356 A1 | 8/2003 | Liu |
| 2003/0163508 A1 | 8/2003 | Goodman |
| 2003/0179910 A1 | 9/2003 | Wong |
| 2003/0194091 A1 | 10/2003 | Wajs |
| 2003/0213849 A1 | 11/2003 | Luu |
| 2004/0001591 A1 | 1/2004 | Mani et al. |
| 2004/0124246 A1 | 7/2004 | Allen et al. |
| 2004/0129785 A1 | 7/2004 | Luu |
| 2004/0143716 A1 | 7/2004 | Hong |
| 2004/0152392 A1 | 8/2004 | Nakamura |
| 2004/0171192 A1 | 9/2004 | Morimura et al. |
| 2004/0181800 A1 | 9/2004 | Rakib et al. |
| 2004/0256150 A1 | 12/2004 | Barchmann et al. |
| 2004/0260823 A1 | 12/2004 | Tiwari et al. |
| 2005/0005287 A1 | 1/2005 | Claussen |
| 2005/0023361 A1 | 2/2005 | Ikefuji et al. |
| 2005/0033688 A1 | 2/2005 | Peart et al. |
| 2005/0061884 A1 | 3/2005 | Stewart |
| 2005/0148121 A1 | 7/2005 | Yamazaki et al. |
| 2005/0197169 A1 | 9/2005 | Son |
| 2005/0212657 A1 | 9/2005 | Simon |
| 2005/0212690 A1 | 9/2005 | Nishikawa |
| 2005/0231921 A1 | 10/2005 | Noda et al. |
| 2005/0247784 A1 | 11/2005 | Klatt |
| 2005/0252978 A1 | 11/2005 | Nishizawa et al. |
| 2006/0026295 A1 | 2/2006 | Iwamura |
| 2006/0043202 A1 | 3/2006 | Kim et al. |
| 2006/0058065 A1 | 3/2006 | Shen et al. |
| 2006/0059391 A1 | 3/2006 | Park et al. |
| 2006/0072293 A1 | 4/2006 | Peele |
| 2006/0131396 A1 | 6/2006 | Blossom |
| 2006/0133051 A1 | 6/2006 | Calvas et al. |
| 2006/0155913 A1 | 7/2006 | Nishikawa et al. |

(56) References Cited

U.S. PATENT DOCUMENTS

| | | |
|---|---|---|
| 2006/0208077 A1 | 9/2006 | Hirata |
| 2006/0283946 A1 | 12/2006 | Riester et al. |
| 2006/0286847 A1 | 12/2006 | Zuo et al. |
| 2007/0028260 A1 | 2/2007 | Williams et al. |
| 2007/0060198 A1 | 3/2007 | Kuo |
| 2007/0067810 A1 | 3/2007 | Durden et al. |
| 2007/0067820 A1 | 3/2007 | Cha |
| 2007/0117550 A1 | 5/2007 | Boris et al. |
| 2007/0121008 A1 | 5/2007 | Kanoh |
| 2007/0125855 A1 | 6/2007 | Jiang et al. |
| 2007/0127185 A1 | 6/2007 | Watanabe |
| 2007/0138301 A1 | 6/2007 | Cinkler |
| 2007/0143784 A1 | 6/2007 | Kubota et al. |
| 2007/0146542 A1* | 6/2007 | Strasser ............ H04N 21/4143 348/462 |
| 2007/0153487 A1 | 7/2007 | Frallicciardi et al. |
| 2007/0176622 A1 | 8/2007 | Yamazaki |
| 2007/0235545 A1 | 10/2007 | Martinez et al. |
| 2007/0237243 A1 | 10/2007 | Fagan |
| 2007/0246536 A1 | 10/2007 | Tuin |
| 2007/0250872 A1 | 10/2007 | Dua |
| 2007/0262156 A1 | 11/2007 | Chen et al. |
| 2007/0266182 A1 | 11/2007 | Lanning |
| 2008/0020800 A1 | 1/2008 | Xu |
| 2008/0041952 A1 | 2/2008 | Kang |
| 2008/0062066 A1 | 3/2008 | Arai |
| 2008/0079565 A1 | 4/2008 | Koyama |
| 2008/0083831 A1 | 4/2008 | Lafuente et al. |
| 2008/0094788 A1 | 4/2008 | Choe |
| 2008/0096317 A1 | 4/2008 | Middlekauff et al. |
| 2008/0099559 A1 | 5/2008 | Lo et al. |
| 2008/0122894 A1 | 5/2008 | Lee et al. |
| 2008/0135626 A1 | 6/2008 | Reignoux et al. |
| 2008/0163290 A1 | 7/2008 | Marko |
| 2008/0165962 A1 | 7/2008 | Kawano et al. |
| 2008/0174408 A1 | 7/2008 | Takahashi |
| 2008/0211074 A1 | 9/2008 | Osako et al. |
| 2008/0211302 A1 | 9/2008 | Hirota et al. |
| 2008/0223937 A1 | 9/2008 | Preta et al. |
| 2008/0257967 A1 | 10/2008 | Nishizawa et al. |
| 2008/0257968 A1 | 10/2008 | Nishizawa et al. |
| 2008/0263623 A1 | 10/2008 | Hildebrand et al. |
| 2008/0279379 A1 | 11/2008 | Muijen |
| 2008/0314983 A1 | 12/2008 | Capurso et al. |
| 2009/0011538 A1 | 1/2009 | Masumoto et al. |
| 2009/0032593 A1 | 2/2009 | Ljungcrantz |
| 2009/0040695 A1 | 2/2009 | Fidalgo et al. |
| 2009/0057417 A1 | 3/2009 | Shinohara et al. |
| 2009/0086657 A1 | 4/2009 | Alpert et al. |
| 2009/0140415 A1 | 6/2009 | Furuta |
| 2009/0144456 A1* | 6/2009 | Gelf .................... G06F 13/4022 710/8 |
| 2009/0156254 A1 | 6/2009 | Montes |
| 2009/0199283 A1 | 8/2009 | Jain |
| 2009/0244858 A1 | 10/2009 | Di Sirio et al. |
| 2009/0275170 A1 | 11/2009 | Chen |
| 2010/0006322 A1 | 1/2010 | Cheng |
| 2010/0019038 A1 | 1/2010 | Puente Baliarda et al. |
| 2010/0025480 A1 | 2/2010 | Nishizawa et al. |
| 2010/0072284 A1 | 3/2010 | Nishizawa et al. |
| 2010/0117800 A1 | 5/2010 | Li et al. |
| 2010/0136816 A1 | 6/2010 | Ahn |
| 2010/0138857 A1 | 6/2010 | Gondkar |
| 2010/0165589 A1 | 7/2010 | Zhou |
| 2010/0169940 A1 | 7/2010 | Howarter et al. |
| 2010/0176207 A1 | 7/2010 | Yoshikawa et al. |
| 2010/0272257 A1 | 10/2010 | Beals |
| 2010/0318627 A1 | 12/2010 | Edwards et al. |
| 2010/0327467 A1 | 12/2010 | Hirabayashi |
| 2011/0010734 A1* | 1/2011 | Newell ............ H04N 21/4181 725/31 |
| 2011/0028184 A1 | 2/2011 | Cooper |
| 2011/0119487 A1 | 5/2011 | Alexander et al. |
| 2011/0138088 A1 | 6/2011 | Sirio et al. |
| 2011/0259966 A1 | 10/2011 | Phillips |
| 2011/0315779 A1 | 12/2011 | Bidin et al. |
| 2012/0007096 A1 | 1/2012 | Yamazaki |
| 2012/0018522 A1 | 1/2012 | Le Garrec et al. |
| 2012/0048948 A1 | 3/2012 | Bertin et al. |
| 2012/0138690 A1 | 6/2012 | Bosquet et al. |
| 2012/0168517 A1 | 7/2012 | Lee |
| 2012/0193435 A1 | 8/2012 | Hanaoka et al. |
| 2012/0231650 A1 | 9/2012 | Tian et al. |
| 2012/0248201 A1 | 10/2012 | Sutera |
| 2012/0267438 A1 | 10/2012 | Kato et al. |
| 2012/0289196 A1 | 11/2012 | Tan et al. |
| 2012/0292395 A1 | 11/2012 | Huang et al. |
| 2013/0008968 A1 | 1/2013 | Launay et al. |
| 2013/0015441 A1 | 1/2013 | Takayama et al. |
| 2013/0112757 A1 | 5/2013 | Lee |
| 2013/0134227 A1 | 5/2013 | De Maquille et al. |
| 2013/0161390 A1 | 6/2013 | Rodriquez |
| 2013/0175346 A1 | 7/2013 | Jenni |
| 2013/0185566 A1 | 7/2013 | Pang |
| 2013/0207781 A1 | 8/2013 | Pagani et al. |
| 2013/0277434 A1 | 10/2013 | Lin |
| 2013/0287267 A1 | 10/2013 | Varone |
| 2013/0320088 A1 | 12/2013 | Lin et al. |
| 2013/0334320 A1 | 12/2013 | Thill et al. |
| 2014/0021264 A1 | 1/2014 | Pueschner et al. |
| 2014/0042230 A1 | 2/2014 | Pueschner et al. |
| 2014/0061316 A1 | 3/2014 | Narayanaswami et al. |
| 2014/0282685 A1 | 9/2014 | Beals et al. |
| 2014/0282808 A1 | 9/2014 | Beals et al. |
| 2015/0016607 A1 | 1/2015 | Beals et al. |
| 2015/0016608 A1 | 1/2015 | Beals et al. |
| 2015/0113585 A1 | 4/2015 | Beals et al. |
| 2015/0143105 A1 | 5/2015 | Beals et al. |

FOREIGN PATENT DOCUMENTS

| | | |
|---|---|---|
| EP | 1463322 | 9/2004 |
| EP | 1662361 | 5/2006 |
| EP | 1765013 | 3/2007 |
| EP | 2204997 | 7/2010 |
| EP | 2541959 | 1/2013 |
| TW | 201246815 | 11/2012 |
| TW | 201247009 | 11/2012 |
| TW | 201301832 | 1/2013 |
| WO | WO 2007/072211 | 6/2007 |
| WO | WO 2011-120901 | 10/2011 |

OTHER PUBLICATIONS

U.S. Appl. No. 13/799,891, Amendment and Response filed Jul. 6, 2015, 13 pages.
U.S. Appl. No. 14/499,956, Non-Final Rejection mailed Jul. 30, 2015, 23 pages.
U.S. Appl. No. 29/448,754, Non-Final Rejection mailed Jul. 31, 2015, 8 pages.
U.S. Appl. No. 14/500,037, Non-Final Rejection mailed Aug. 10, 2015, 20 pages.
U.S. Appl. No. 13/799,891, Final Rejection mailed Aug. 10, 2015, 14 pages.
U.S. Appl. No. 14/500,113, Non-Final Rejection mailed Aug. 12, 2015, 21 pages.
U.S. Appl. No. 29/448,761, Non-Final Rejection mailed Aug. 14, 2015, 7 pages.
U.S. Appl. No. 13/799,774, Amendment and Response filed Oct. 1, 2015, 11 pages.
International Search Report and Written Opinion for PCT/US2013/039803, mailed Jan. 23, 2014, 13 pages.
International Search Report and Written Opinion for PCT/US2013/039806, mailed Jan. 23, 2014, 12 pages.
International Standard (1999) "Information technology—Identification cards—Integrated circuit(s) cards with contacts—Part 2: Dimensions and location of the contacts" Reference No. ISO/IEC 7816-2: 1999E, 11 pages.
ISO 7816—Smart Card Standards Overview. Artemis Solutions Group LLC, 2004 (17 pages).

(56) References Cited

OTHER PUBLICATIONS

Notice of Allowance for Chinese Patent Application No. 201330395635.2, mailed Dec. 2, 2013.
Notice of Allowance for Chinese Patent Application No. 201330395780.0, mailed Jan. 10, 2014.
Notice of Allowance for Chinese Patent Application No. 201330395895.X, mailed Nov. 19, 2013.
TW Patent Application No. 102304015, Office Action mailed Mar. 24, 2014, 3 pages. English Translation).
TW Patent Application No. 102304016, Office Action mailed Mar. 24, 2014, 3 pages. (English Translation).
TW Patent Application No. 102304017, Office Action mailed Mar. 24, 2014, 3 pages. (English Translation).
U.S. Appl. No. 13/799,774, Non-Final Rejection mailed Jul. 15, 2014, 12 pages.
U.S. Appl. No. 29/448,754, Non-final Rejection mailed Sep. 10, 2014, 26 pages.
U.S. Appl. No. 29/448,761, Non-final Rejection mailed Sep. 10, 2014, 26 pages.
U.S. Appl. No. 29/448,766, Notice of Allowance mailed Sep. 18, 2014, 28 pages.
U.S. Appl. No. 29/448,754, Amendment and Response filed Dec. 10, 2014, 5 pages.
U.S. Appl. No. 29/448,761, Amendment and Response filed Dec. 10, 2014, 6 pages.
U.S. Appl. No. 29/448,766, Notice of Allowance mailed Jan. 12, 2015, 36 pages.
U.S. Appl. No. 13/799,774, Amendment and Response filed Jan. 15, 2015, 12 pages.
U.S. Appl. No. 13/799,891, Non-final Rejection mailed Feb. 3, 2015, 22 pages.
U.S. Appl. No. 29/448,761, Non-final Rejection mailed Mar. 26, 2015, 12 pages.
U.S. Appl. No. 29/448,754, Non-final Rejection mailed Apr. 1, 2015, 11 pages.
U.S. Appl. No. 13/799,774, Final Rejection mailed Apr. 1, 2015, 10 pages.
U.S. Appl. No. 29/448,754, Amendment and Response filed Apr. 15, 2015, 10 pages.
U.S. Appl. No. 29/448,761, Amendment and Response filed Apr. 20, 2015, 9 pages.
European Patent Application No. 15184485.9, EESR mailed Mar. 3, 2016, 9 pages.
U.S. Appl. No. 14/499,956, Amendment and Response filed Nov. 30, 2015, 7 pages.
U.S. Appl. No. 13/799,891, Amendment and Response filed Dec. 10, 2015, 14 pages.
U.S. Appl. No. 14/500,037, Amendment and Response filed Dec. 10, 2015, 8 pages.
U.S. Appl. No. 14/500,113, Amendment and Response filed Dec. 14, 2015, 8 pages.
U.S. Appl. No. 29/448,754, Amendment and Response filed Dec. 30, 2015, 7 pages.
U.S. Appl. No. 29/448,761, Amendment and Response filed Dec. 30, 2015, 8 pages.
U.S. Appl. No. 13/799,891, Non-Final Rejection mailed Jan. 14, 2016, 10 pages.
U.S. Appl. No. 29/448,761, Notice of Allowance mailed Jan. 22, 2016, 6 pages.
U.S. Appl. No. 14/499,956, Final Rejection mailed Jan. 29, 2016, 8 pages.
U.S. Appl. No. 29/448,754, Notice of Allowance mailed Jan. 29, 2016, 6 pages.
U.S. Appl. No. 14/500,037, Final Rejection mailed Feb. 16, 2016, 9 pages.
U.S. Appl. No. 14/500,113, Final Rejection mailed Feb. 17, 2016, 8 pages.
U.S. Appl. No. 14/500,113, Amendment and Response filed Jun. 17, 2016, 12 pages.
U.S. Appl. No. 14/500,113, Office Action mailed Jun. 28, 2016, 10 pages.
U.S. Appl. No. 13/799,891, Amendment and Response filed Nov. 18, 2016, 17 pages.
U.S. Appl. No. 14/499,956, Office Action mailed Nov. 8, 2016, 10 pages.
U.S. Appl. No. 14/500,037, Office Action mailed Nov. 10, 2016, 9 pages.
U.S. Appl. No. 14/500,113, Office Action mailed Nov. 28, 2016, 10 pages.
Smart Card Module Poster complied by Endre Nagy of Hungary 1 page poster, edition Mar. 2004, www.wrankl.de/Uthings/Training.html.
U.S. Appl. No. 13/799,774, Notice of Allowance mailed Apr. 28, 2016, 7 pages.
U.S. Appl. No. 13/799,774, Amendment and Response filed Feb. 16, 2016, 11 pages.
U.S. Appl. No. 13/799,774, Office Action mailed Nov. 16, 2015, 10 pages.
U.S. Appl. No. 13/799,891, Amendment and Response filed Jun. 14, 2016, 16 pages.
U.S. Appl. No. 13/799,891, Office Action mailed Jul. 18, 2016, 12 pages.
U.S. Appl. No. 14/499,956, Amendment and Response filed May 31, 2016, 11 pages.
U.S. Appl. No. 14/499,956, Office Action mailed Jun. 17, 2016, 10 pages.
U.S. Appl. No. 14/500,037, Office Action mailed Jun. 24, 2016, 10 pages.
U.S. Appl. No. 14/500,037, Amendment and Response filed Jun. 16, 2016, 12 pages.
U.S. Appl. No. 14/608,900, Amendment and Response filed Jun. 21, 2016, 17 pages.
U.S. Appl. No. 14/608,900, Office Action mailed Aug. 5, 2016, 14 pages.
U.S. Appl. No. 29/521,234, Notice of Allowance mailed Sep. 8, 2016, 26 pages.
U.S. Appl. No. 29/521,236, Notice of Allowance mailed Sep. 12, 2016, 26 pages.
European Patent Application No. 13877922.1, EESR mailed Sep. 7, 2016, 8 pages.
Chinese Notice of Allowance in 201530425865.8 mailed Jun. 7, 2016, 4 pages.
Taiwanese Office Action in 104306112 mailed Jun. 23, 2016, 9 pages.
U.S. Appl. No. 13/799,891, Amendment and Response filed Dec. 1, 2014, 8 pages.
European Communication in 138782164, mailed Sep. 21, 2016, 7 pages.
U.S. Appl. No. 14/499,956, Amendment and Response filed Sep. 23, 2016, 12 pages.
U.S. Appl. No. 14/500,037, Amendment and Response filed Sep. 26, 2016, 11 pages.
U.S. Appl. No. 14/500,113, Amendment and Response filed Sep. 28, 2016, 12 pages.
U.S. Appl. No. 29/521,234, Notice of Allowance mailed Oct. 14, 2016, 5 pages.
U.S. Appl. No. 29/521,236, Notice of Allowance mailed Oct. 17, 2016, 5 pages.
Taiwanese Office Action in Application 102144271, mailed Jan. 20, 2017, 9 pages.
Taiwanese Office Action in Application 102144270, mailed Feb. 10, 2017, 13 pages.
European Search Report in Application 13878216.4, mailed Jan. 13, 2017, 16 pages.
U.S. Appl. No. 13/799,891, Office Action mailed Dec. 30, 2016, 12 pages.
U.S. Appl. No. 14/499,956, Amendment and Response filed Mar. 8, 2017, 12 pages.
U.S. Appl. No. 14/500,037, Amendment and Response filed Mar. 10, 2017, 11 pages.
U.S. Appl. No. 29/567,139, Notice of Allowance mailed Mar. 10, 2017, 28 pages.

(56) References Cited

OTHER PUBLICATIONS

U.S. Appl. No. 29/567,135, Notice of Allowance mailed Mar. 10, 2017, 30 pages.
U.S. Appl. No. 29/525,632, Office Action mailed Mar. 2, 2017, 17 pages.

* cited by examiner

USB INTERFACE FOR PERFORMING TRANSPORT I/O

CROSS-REFERENCE TO RELATED APPLICATIONS

This application is a continuation-in-part of U.S. patent application Ser. No. 13/799,891 filed on Mar. 13, 2013, entitled "SYSTEMS AND METHODS FOR PERFORMING TRANSPORT I/O" which is incorporated herein by reference it its entirety. This application also claims the benefit of U.S. Provisional Patent Application No. 62/048,142 filed on Sep. 9, 2014, entitled "SYSTEMS AND METHODS FOR PERFORMING TRANSPORT I/O" which is also incorporated herein by reference in its entirety.

BACKGROUND

Digital Video Broadcasting (DVB) is an internationally recognized standard for transmitting digital television over cable, satellite, and other transmission mediums. A weakness of the DVB architecture is that the network control word used to decrypt content is easily shared over the Internet allowing non-subscribers access to broadcasted content. It is with respect to this general environment that embodiments of the present invention have been contemplated.

SUMMARY

Embodiments of the present disclosure relate to systems and methods to access content using a Transport I/O system. In embodiments, a secure processor receives network encrypted content. The secure processor may decrypt the network encrypted content using a network control word. In such embodiments, the network control word never leaves the secure processor and, thus, is protected from interception by an unauthorized user.

In further embodiments, after decrypting the network encrypted content, the secure processor may re-encrypt the content using a local control word to produce locally encrypted content. The locally encrypted content may be uniquely encrypted for a specific device such as, for example, a set-top-box, a system on a chip, or any other type of device capable of receiving and modifying content. In embodiments, the secure processor provides the locally encrypted content to the device.

The device may receive the locally encrypted content and obtain the local control word. Using the local control word, the device may decrypt the locally encrypted content to produce clear content. The clear content may be processed by the device. For example, the device may display the content or store the content for later use. In embodiments, the secure processor may leverage standard connections to enable interaction with many different types of devices.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The same number represents the same element or same type of element in all drawings.

DETAILED DESCRIPTION

Figure 1:
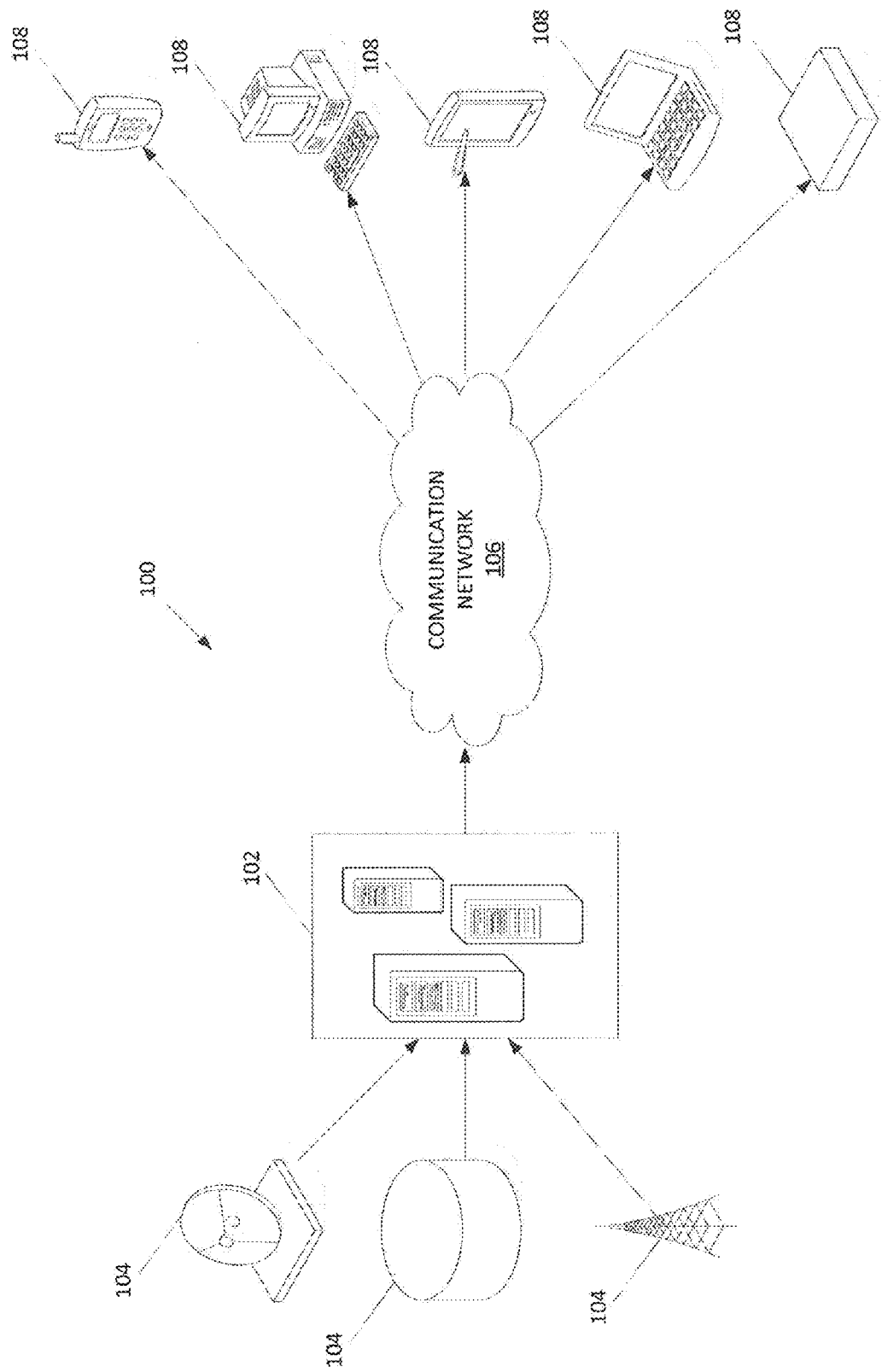
FIG. 1 illustrates a communications system 100 that may be employed with a Transport I/O system to protect content.

The various embodiments described herein generally provide systems and methods for protecting streamed content by employing a Transport I/O system. In embodiments, a Transport I/O system can be employed to decrypt content, such as, but not limited to, a network broadcast stream without exposing a network encryption key to an unauthorized party. For example, in an embodiment where a Transport I/O system is operating in a Digital Video Broadcasting environment, a Transport I/O system may maintain a control word on a smart card and use the control word to decrypt a network broadcast on the smart card, rather than providing a decrypted control word to a descrambler that is not part of the smart card. In other embodiments, a Transport I/O system may protect a control word from exposure by applying additional encryption to a control word, securely communicating a control word to another component, etc. One of skill in the art will appreciate that any other means of reducing the risk of exposure of a control word or control words may be employed by a Transport I/O system.

In embodiments, the systems and methods disclosed herein may be practiced in a Digital Video Broadcasting (DVB) compliant system. DVB is a set of internationally accepted open standards for broadcasting digital television. The DVB standards define both the physical layer and the data link layer of a distributed system. There are DVB standards defining the distribution of content over various different mediums. For example, satellite transmissions are defined in the DVB-S, DVB-S2, and DVB-SH specifications. Cable transmission is defined in the DVB-C and DVB-C2 specifications. Terrestrial television transmission is defined in the DVB-T and DVB-T2 specifications for standard television formats and DVB-H and DVB-H2 for the transmission of mobile television, e.g., television for handheld devices such as mobile phones. Microwave transmission is defined in the DVB-MT, DVB-MC, and DVB-MS standards.

In addition to defining the physical and data link layers, the DVB suite of standards includes standards that are used to provide conditional access protection of the transmitted content. Examples include the DVB-CA, DVB-CSA, and DVB-CI standards. Conditional access is a method of protecting content by requiring a device to meet certain criteria before it accesses content. Conditional access plays an important role in ensuring that broadcasted content is made available only to subscribers of a particular broadcast system (e.g., cable and satellite customers, etc.). The general architecture uses a global key, called a network control word (NCW), for performing conditional access. One or more NCW's are used to encrypt data before it is broadcast to subscribers. The NCW's are transmitted by a head-end (e.g., a satellite or cable provider) to subscriber devices in an entitlement control message (ECM). The ECM is generally encrypted before transmission to the subscriber device. The conditional access system of the subscriber devices (e.g., a smart card or other conditional access module whether in hardware or software) decrypts the ECM using information received in an entitlement management message (EMM) transmitted from the head-end. The subscriber device can then use the NCW's to decrypt the content broadcast by the head-end. Generally, a NCW is used for a certain period of time, or a crypto period. Upon expiration of a crypto period a new crypto period begins. The head-end may then transmit a new NCW to a subscriber device(s) and proceed to use the new NCW to encrypt the broadcast content.

One of the main weaknesses of the DVB conditional access architecture is that a NCW can be decrypted and easily shared over the Internet. Because the content is broadcast to many users, the content must be encrypted with the same key (e.g., same network control word) for every subscriber. Thus, once the network control word is discovered, any unauthorized user (e.g., a non-subscriber) with access to the network may use the network control word to decrypt the broadcast content. Generally, the NCW's consists of eight (8) bytes. The duration of a crypto period usually varies between five (5) to sixty (60) seconds. Thus, a non-subscriber may defeat the DVB conditional access architecture based upon the discovery of the eight (8) byte NCW, a task which may be accomplished within the duration of a typical crypto period. Generally, after the NCW is obtained by the smart card the smart card provides the NCW to an external device or component. The external device or component uses the NCW to decrypt the broadcast content. However, the NCW may be intercepted and shared with others, thereby allowing unauthorized sharing of the content.

While the present disclosure describes the Transport I/O system as a solution to the shortcomings of DVB conditional access, one of skill in the art will appreciate that the methods and systems disclosed herein can be practiced to protect content in other types of data transmission streaming and/or broadcasting that are not compliant with the DVB architecture such as, but not limited to, streaming media over the Internet. The systems and methods disclosed herein with respect to the Transport I/O system will now be discussed in detail with respect to the accompanying figures.

FIG. 1 illustrates a communications system 100 that may be employed with a Transport I/O system to protect content. The communications system includes a head-end device 102 that receives content from content providers 104 and distributes the content across a communication network 106 to various recipient devices 108. The recipient devices can access the content and display it to a user. A single recipient device 108 can be any device capable of receiving and decoding a data transmission stream over communication network 106. Such devices include, but are not limited to, mobile phones, smart phones, personal digital assistants (PDAs), satellite or cable set-top-boxes, desktop computers, laptop computers, tablet computers, televisions, radios, a video processing device, or any other device known to the art. In embodiments, recipient devices 108 of subscribers are generally able to access the encryption key used to decrypt the content, while non-subscribers are not able to access the encryption key without circumventing the security measures employed by the head-end device 102 broadcasting the content over the communication network 106.

In embodiments, the head-end 102 may be a distribution point of a cable television provider, the distribution of point of a satellite television provider (e.g., a satellite), a terrestrial wireless network, a server broadcasting content over the Internet, or any type of device capable of distributing content over a communications network. One of skill in the art will appreciate that the head-end device 102 may be any type of device, or a collection of devices (as the case may be), that are capable of receiving, encrypting, and broadcasting content over a network.

In one embodiment, the content broadcast over communications system 100 may be generated by the head-end device 102. In other embodiments, the head-end device 102 may receive content from one or more content providers 104. In such embodiments, the head-end device 102 is in electrical communication with one or more content providers 104. For example, a content provider may be a cable, terrestrial, or satellite television station that transmits content to the head-end device 102 over a wired (e.g., cable, fiber optic, or Internet connection) or wireless connection (e.g., via radio, microwave, or satellite communications). In other embodiments, the content may reside in a datastore that is in electrical communication with the head-end device 102. While FIG. 1 depicts the content providers 104 as being separate entities from the head-end device 102, in other embodiments, the content providers 104 and head-end device 102 may be a single entity.

The head-end device 102 is tasked with distributing the content over a communication network 106 to various recipient devices 108. In embodiments, the communication network 106 may be the Internet, a cable network, a fiber optic network, a satellite communications network, a terrestrial broadcasting network (e.g., networks communicating over radio or microwave transmission mediums), a cellular data network, a wide area network (WAN), a local area network (LAN), a plain old telephone service (POTS) network, the Internet, or any other type of communication network capable of streaming, broadcasting, and/or otherwise facilitating data transmissions between various devices. One of skill in the art will appreciate that the systems and methods disclosed herein can be practiced regardless of the type of communication network used to transmit data between devices. In many cases, the head-end device 102 may broadcast the content in a data transmission stream over the communications network rather than sending content to a particular device. Because the content is being broadcast over the communication network 106, the transmission can be received by any number of devices capable of interacting with the communication network 106. In order to prevent unauthorized users from accessing the broadcasted data transmission stream, the head-end device 102 encrypts the data transmission stream before it is broadcast over the communication network 106. Because the network broadcasted content is made available to multiple devices, a common encryption key (e.g., a network control word) may be used to encrypt the network broadcasted content (e.g., network encrypted content). In embodiments, the network broadcast content may be a network encrypted stream that includes content, such as network encrypted content, and data. In embodiments, the data contain information about the stream such as, but not limited to, encryption information, timing information, compression information, or any other type of information. Although not illustrated in FIG. 1 the communication network may also be used to perform two-way communication between the head-end device 102 and the recipient device or devices 108.

In embodiments, the data transmission stream is encrypted using a one or more keys, such as, but not limited to, a network control work (NCW). The NCW may be used to encrypt the data transmission stream for a certain amount of time (e.g., a crypto period) thereby resulting in the creation of network encrypted content. In embodiments, network encrypted content may be encrypted using a common key (e.g., an NCW) such that the network encrypted content can be decrypted by authorized users (e.g., subscribers). The NCW is shared between head-end device 102 and the various recipient device or devices 108. In one embodiment, communication system 100 may operate according to the DVB architecture. In such embodiments, the NCW may be a control word (CW) that acts as the key used in encrypting the content. In such environment, the head-end 102 may periodically transmit the NCW to the various subscriber devices using an ECM message. Additionally, the head-end 102 transmits an EMM message to the various subscribers which contains information necessary to decrypt the ECM and retrieve the NCW. In such embodiments, the EMM may be decrypted by a secure device or processor, such as a smart card that is part of or connected to the recipient device to retrieve the NCW. The smart card may then provide the NCW to another component that is part of or in communication with the recipient device to decrypt the content. However, once the NCW is sent from the secure device and/or processor, the CW may be intercepted and shared with others to provide unauthorized access to the content.

In embodiments, the Transport I/O system solves this problem by maintaining the decrypted control word in a secure processing device (e.g., on a smart card, secure processor, secure memory, or any other secure device or secure component of a device). In such embodiments, the decrypted CW is maintained on the secure device, thereby preventing the interception and sharing of the CW. In such embodiments, the secure content (e.g., an encrypted broadcast or encrypted content) may be decrypted on the secure processing device. The secure processing device may then provide the clear content (e.g., decrypted content). While the clear content may be intercepted and shared, it may not be as easy to share the content due to the size of the content and the bandwidth required to share the content. In another embodiment, the secure processing device may uniquely encrypt the content for use by a specific device (e.g., a recipient device 108). For example, in such embodiments a method utilizing a local encryption key, or local control word (LCW), may be used to create locally encrypted content. The local control word may be unique to a local device. The secure processor or secure processing device may then provide the locally encrypted content to the local device. Furthermore, in embodiments, the locally encrypted content may be uniquely encrypted for a specific device such as, for example, a set-top-box, a system on a chip, or any other type of device capable of receiving and modifying content.

Figure 2:
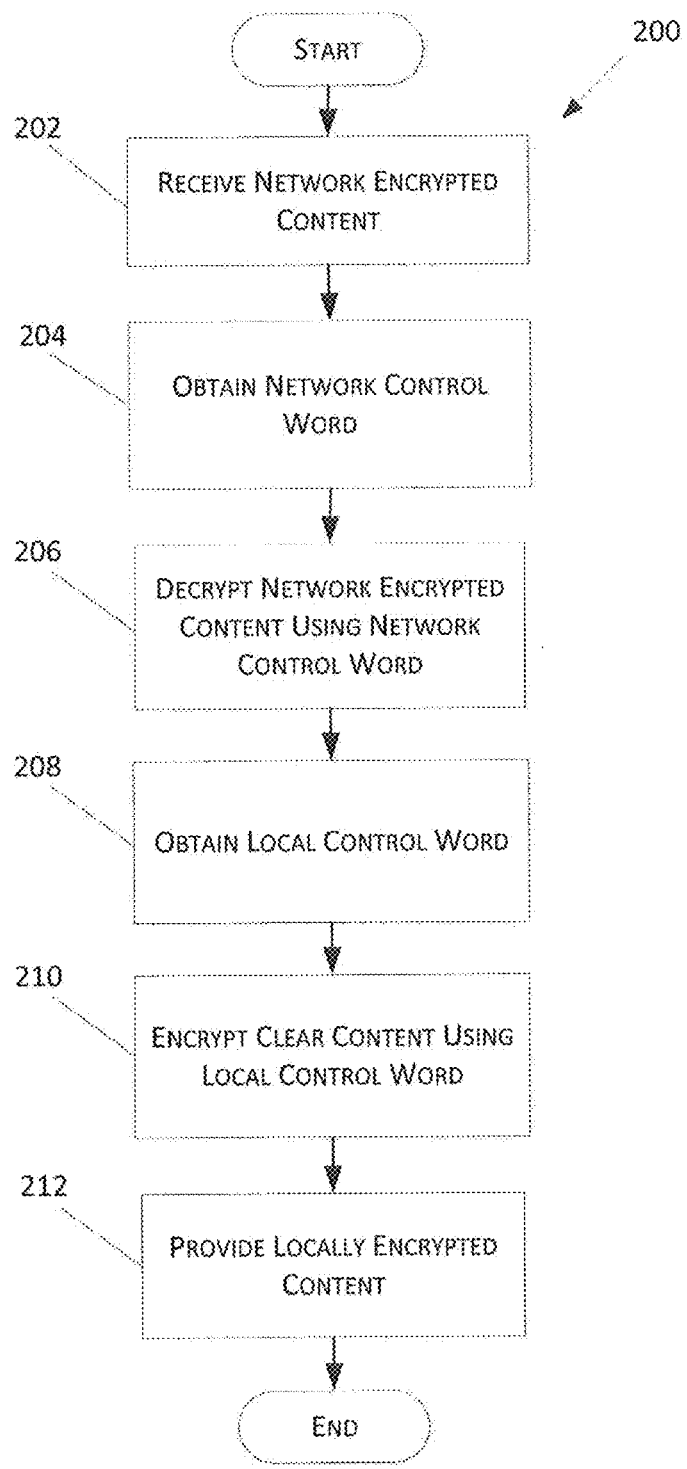
FIG. 2 is a flowchart representing an embodiment of a method 200 of performing network content decryption.

FIG. 2 is a flowchart representing an embodiment of a method 200 of performing network content decryption. In embodiments, the method 200 may be performed by a secure device or a secure processor. An example of a secure device is a smart card. Flow begins at operation 202 where the network encrypted content is received by the secure device. In embodiments, network secure content may be content encrypted using a NCW. The NCW may be a common control word or encryption key that is used to encrypt and decrypt content sent to multiple users or subscribers. In one embodiment, the network encrypted content may be a single stream of data. In alternate embodiments, the network encrypted content may contain multiple network encrypted streams, such as network encrypted elementary streams. Network encrypted elementary streams may be streams that contain audio data, video data, closed captioned data, or any other type of data. A network encrypted elementary stream may consist of compressed data from a single source, such as a particular network or channel. In embodiments where the network encrypted content may contain multiple network encrypted elementary streams, one or more network encrypted elementary streams may be individually received at operation 202. However, in alternate embodiments, the network encrypted content comprising multiple network encrypted elementary streams may be received at operation 202. In such embodiments, individual network streams may be filtered out, e.g., by performing PID filtering or other type of filtering, to isolate one or more individual network encrypted elementary streams at operation 202. Upon receiving the network encrypted content, flow continues to operation 204 where the network control word is obtained. In one embodiment, the network control word may be a control word provided by the content supplier, such as, but not limited to, a head-end or a server transmitting the content. In embodiments, the network control word may be previously known by the device performing the method 200. In another embodiment, the network control word may be received by the device. In such embodiments, the network control word may be encrypted, and operation 204 may include decrypting the network control word. For example, in embodiments, the network control word may be obtained by decrypting an ECM that contains the network control word. The ECM may be decrypted using information from another message, such as an EMM. While the ECM and EMM messages are part of the DVB architecture, one of skill in the art will appreciate that other content delivery systems and architectures may be employed with the systems and methods disclosed herein.

Flow continues to operation 206 where the network encrypted content (e.g., a network encrypted elementary stream or multiple network encrypted elementary streams) is decrypted using the network control word. In one embodiment, a single network control word may be used to decrypt the network encrypted content. In alternate embodiments, multiple control words may be used to decrypt the network encrypted content such as, for example, when the network encrypted content comprises multiple network encrypted elementary streams that have each been encrypted using a different network control word. In such embodiments, multiple network control words may be obtained at operation 204 and then used to decrypt multiple network elementary streams at operation 206. However, in still other embodiments, a single network control word may be used to encrypt multiple network elementary streams. In such embodiments, a single network control word may be used to decrypt the multiple network encrypted elementary streams. Decryption of the network encrypted content at operation 206 may result in clear content, that is, content that is not protected by encryption. Because operations 202-206 may be performed by a secure device or secure processor, such as, but not limited to, a smart card, the network control word remains on the secure device. By maintaining the network control word on the device, an unauthorized subscriber cannot intercept the network control word that is transmitted between the smart card and a device, such as a set-top-box, thereby impeding access to content by an unauthorized subscriber. In embodiments not shown in FIG. 2 the clear content may be provided by the secure processor for display or storage after decryption step 206. However, in the illustrated embodiment, an additional layer of protection may be added by performing local link encryption. In embodiments, local link encryption may comprise the re-encryption of the clear content using a local control word (LCW). The local control word may be an encryption key that is unique to a specific device. For example, in a set-top-box environment, the LCW may be an encryption key that is only shared with the particular set-top-box that the smart card performing the method 200 may be in communication with. In embodiments, different types of encryption modes may be performed for local link encryption. In one embodiment, not all of the data representing the content may be encrypted using local link encryption. For example, transport mode encryption may be used. In embodiments transport mode encryption comprises a determination as to which bytes of data to encrypt based upon an MPEG2 transport encryption. In another embodiment, Bulk Mode encryption may be performed. In Bulk Mode encryption, all bytes representing the data may be encrypted during local link encryption. Bulk Mode encryption may be utilized to exchange data between devices in a secure manner. For example, Bulk Mode encryption may be used to mix transport input (e.g., content) with internal data that is used by the one or more components participating in encryption/decryption of content. In further embodiments, Bulk Mode encryption may be utilized to support other types of content streams that may provide additional features, such as Internet Protocol television (IPTV) content streams. Selection of the encryption mode may be based upon data that is present in the content or a data stream that includes the content. For example, one or more bits may be a part of or added to the clear content to identify an encryption mode to perform during local link encryption. Furthermore, in embodiments, the encryption algorithm performed during local link encryption may be compliant with the ATIS-08000006 standard. However, one of skill in the art will appreciate that any type of encryption algorithm may be used for local link encryption, so long as the same encryption algorithm is available on both the smart card and the device.

In embodiments, a key setup used to select a key to be used for local link encryption may take place across security boundaries. For example, a key exchange may be made between a smart card and a set-top-box as part of the key setup. An exchanged key may be generated by a secure device, such as a smart card, and transmitted to a specific device that is communicating with the secure device, such as a set-top-box. Because the local link encryption key is specific to a single device, and not a network transmission, interception of the local link encryption key does not provide an unauthorized user the ability to globally access the broadcasted network content. In embodiments, multiple keys may be used for local link encryption. For example, a smart card may be able to simultaneously process multiple input streams and output multiple locally encrypted streams. In such embodiments, each locally encrypted stream may be encrypted using a unique local link encryption key. However, in other embodiments, the same local link encryption key may be used to encrypt each of the locally encrypted streams.

Flow continues to operation 208 where a local control word is obtained. A local control word may be any type of encryption key. In embodiments, the local control word may be an encryption key that is specific to a target device. In embodiments, the local control word may be obtained from ordinary software registers, a hardware key ladder, a random key generator, or from any other source. In one embodiment, the local control word may be dynamically generated and shared with a recipient device. In such embodiments, the key may be generated based upon characteristics of the device. In embodiment, multiple keys may be selected during obtain operation 208. For example, two keys may be selected from a key ladder. A key ladder may store or otherwise identify a plurality of interrelated keys. In embodiments, any type of encryption key or keys, e.g., fixed encryption keys, dynamic encryption keys, randomly generated encryption keys, etc. may be employed with the embodiments disclosed herein.

After obtaining the local control word, flow continues to operation 210 where the network decrypted content is re-encrypted using the local control word to generate locally encrypted content. As was previously discussed, different types of encryption modes and encryption algorithms may be used to encrypt the content at operation 210. In an embodiment, the encryption may be based upon the key obtained at operation 208. In embodiments where multiple keys are obtained, one of the keys may be selected and used during encryption at operation 210. For example, an appropriate key may be selected based upon an identifier in the content. The identifier may be part of the content or may be added to the content or a header associated with the content as it is processed during the method 200. The identifier may be a single bit that identifies an even or an odd key (in embodiments where two keys are obtained). This identifier provides for the automatic selection of a key for use during the encryption process at operation 210.

In further embodiments, in addition to encrypting the content, the size of the content may be increased. It may be beneficial to increase the size of the content in order to make it more difficult for the content to be shared over a network. For example, increasing the content size will require greater bandwidth to properly share the content with unauthorized users over a network. For example, data may be added to a broadcast stream to make it more difficult to process or share with unauthorized users. In embodiments where the content is streamed (e.g., audio and/or video content) non-content data packets may be added to the content stream and the bandwidth rates may be increased. The increase in bandwidth and the addition of non-content data provides additional security for the content when it leaves the secure device and/or secure processor that performs the method 200 by making the content more difficult to share and process. Further details regarding stream expansion are provided in U.S. Pat. No. 8,385,542 entitled, "Methods and Apparatus for Securing Communications Between a Decryption Device and a Television Receiver," filed on Apr. 27, 2009, which is hereby incorporated by reference in its entirety.

While the embodiment of the method 200 is illustrated as decrypting the network encrypted content, and subsequently locally encrypting the decrypted network encrypted content as two distinct operations, one of skill in the art will appreciate that, in embodiments, the decryption and encryption may be performed sequentially, performed as a single operation, or performed in parallel. In embodiments, a person of skill in the art will appreciate that stream expansion may also be performed in the single decryption/encryption operation. As such, one of skill in the art will appreciate that the method described with respect to FIG. 2 may be performed using fewer or more operations than are illustrated herein.

In further embodiments, the method 200 may operate on stream data. In such embodiments, a network encrypted stream may be received at operation 202, a clear content stream may be generated by decrypting the network encrypted stream at operation 204, and a locally encrypted stream may be generated at operation 212. One of skill in the art will appreciate that the embodiments disclosed herein with respect to FIG. 2 (as well as with respect to FIGS. 3-4) may operate on stream data as well as data transmitted in any other form.

Further to the embodiment illustrated by FIG. 2, after performing the local encryption, flow continues to operation 212 where the locally encrypted content is provided to another device. For example, in a set-top-box environment, a smart card may provide the locally encrypted content to other components of the set-top-box for storage and/or display at operation 212. In a general computing device, the locally encrypted content may be provided from a secure processor to a general processor and/or unprotected memory for storage and/or display at operation 212. One of skill in the art will appreciate that the method 200 provides a solution to the problems described herein by providing locally encrypted content to unsecure components as opposed to providing a control word or encryption key as is generally performed by devices and systems that do not support embodiments of a Transport I/O system as described herein. Furthermore, one of skill in the art will appreciate that the weakest security leak in such content protection systems may occur when data is transmitted from a secure device and/or processor to a general device. However, embodiments disclosed herein address this weakness by providing locally encrypted content and, optionally, content that has its data and bandwidth expanded, thereby making it harder for an unauthorized user to process, share, and access the content even if it is intercepted as it is transmitted within the secure device and/or processor system/architecture.

In one embodiment, the locally encrypted content may be provided as individual locally encrypted elementary streams. For example, in embodiment where multiple network encrypted elementary streams are received and decrypted, the multiple elementary streams may be individually encrypted and returned as individual locally encrypted elementary streams. In an alternate embodiment, the multiple network encrypted elementary streams may be multiplexed into a single output stream. In such embodiments, the single output stream may be locally encrypted and then provided at operation 212. In embodiments, multiple elementary streams may be multiplexed into a single output stream prior to the local encryption performed at operation 210 or after the local encryption operation 210.

Figure 3:
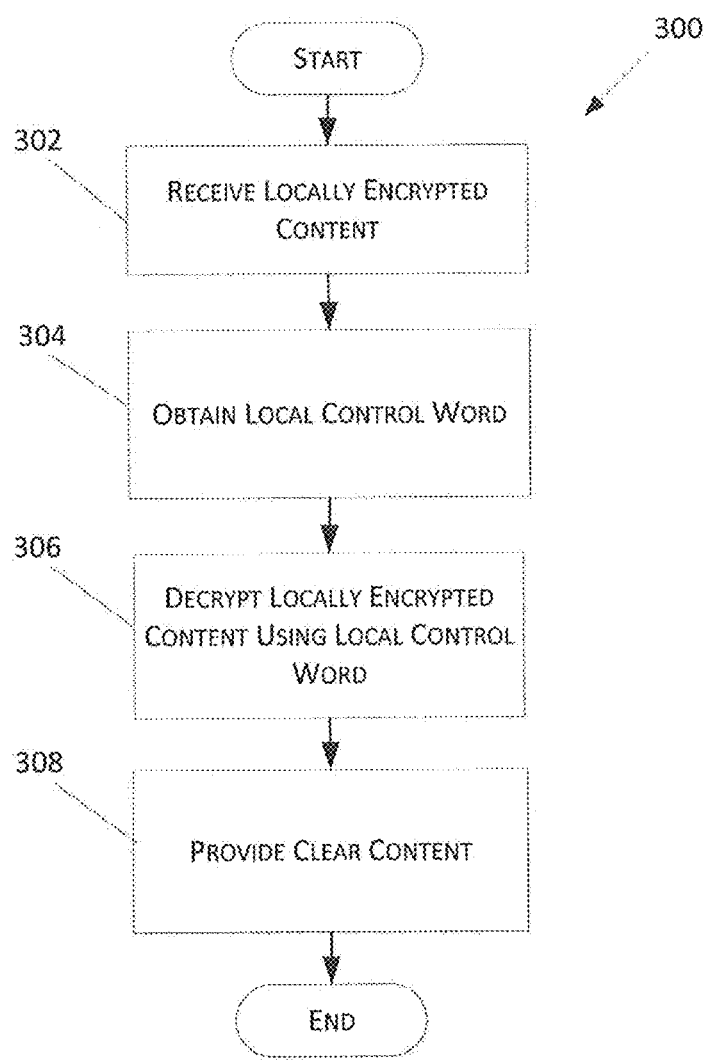
FIG. 3 is an embodiment of a method 300 for processing locally encrypted content.

FIG. 3 is an embodiment of a method 300 for processing locally encrypted content. In embodiments, the method 300 may be performed by a device such as a set-top-box, a laptop computer, a tablet computer, a smart phone, a television, or any other type of general computing device. Flow begins at operation 302 where the locally encrypted content is received. In embodiments, the locally encrypted content may be received from a secure device and/or secure processor that performed the method 200 described with respect to FIG. 2. For example, in a non-limiting embodiment, the locally encrypted content may be received from a smart card that is in communication with a set-top-box. In another embodiment, the locally encrypted content may be received from a secure processor that is in communication with a general processor and/or general memory.

Upon receiving the locally encrypted content, flow continues to operation 304 where a local control word is obtained. A local control word may be any type of encryption key. In embodiments, the local control word may be an encryption key that is specific to the device performing the method 300. In embodiments, the local control word may be obtained from the smart card using ordinary software registers, a hardware key ladder, a random key generator, or from any other source unique to the device. In one embodiment, the local control word may be received from the secure device and/or processor performing the method 200. In another embodiment, the local control word may be generated by the device performing the method 300. In such embodiments, the local control word may have been previously shared with a secure processing device and/or secure processor that created the locally encrypted content received at operation 302. The local control word may be randomly generated. In embodiments, a single local control word may be used. In other embodiments, multiple local control words may be used. In such embodiments, the local control word may change periodically such that a local control word is discarded for a new local control word after a set period of time.

Flow continues to operation 306 where the locally encrypted content is decrypted using the local control word. Decryption of the locally encrypted content may produce content in the clear that is accessible by an application. One of skill in the art will appreciate that many type(s) of encryption mode(s) and/or algorithm(s) may be employed to decrypt the locally encrypted content. As such, a type of decryption algorithm may be employed at operation 306 to decrypt the content using the local control word. Furthermore, the device performing the decryption may be capable of handling and processing the locally encrypted content despite the increased bandwidth of the locally encrypted content due to non-content data. In such embodiments, decryption of the locally encrypted content at operation 306 may include identifying and removing non-content data from the content. In another embodiment, removal of the non-content data may not take place until the clear content is processed for display or storage.

Flow continues to operation 308 where the clear content is provided. In one embodiment, providing the clear content may include decoding, displaying and or otherwise playing the clear content. For example, the clear content may be displayed on a television, monitor, and or display that may be part of the device or in communication with the device performing the method 300. In another embodiment, providing the clear content may include storing the clear content in data storage that may be part of the device or connected to the device performing the method 300.

In an alternate embodiment, persistent encryption may be performed by not immediately decrypting the locally encrypted content as described in FIG. 3. In such embodiments, persistent encryption may be utilized on content, such as MPEG Transport Packets received from a broadcasted network transmission. In such embodiments, a secure device may still perform network decryption and local link encryption as described in FIG. 2; however, the device that receives the locally encrypted content may not immediately perform local link decryption. Instead, the device receiving the locally encrypted content may store the locally encrypted content, as it is encrypted, for later use. This allows the content to be encrypted for secure local storage, but the secure device can still control when the content is decrypted by, for example, providing a decryption key at a later time.

Figure 4:
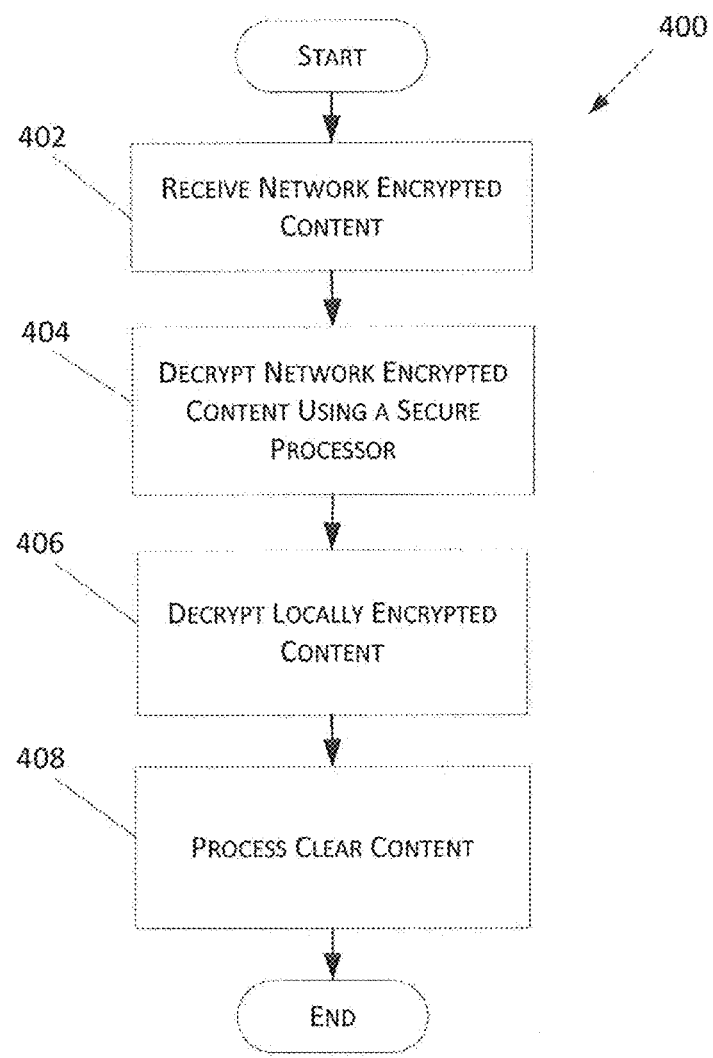
FIG. 4 is an embodiment of a method 400 for receiving and processing protected content using a Transport I/O system.

FIG. 4 is an embodiment of a method 400 for receiving and processing protected content using a Transport I/O system. In embodiments, the method 400 may be performed by a set-top-box, a smartphone, a laptop, a tablet, a television, or any other type of general computing device such as the recipient devices discussed with respect to FIG. 1. In embodiments, the device performing the method 400 may include or be in communication with and/or include a secure processing device and/or secure processor. The secure processing device and/or secure processor may be a removable component of the device. For example, the secure processor may be incorporated within a removable smart card that may be inserted and removed from a device performing the method 400.

Flow begins at operation 402 where network encrypted content is received. Network encrypted content may be received from a head-end device. In embodiments, the network encrypted content may be received over a wireless or wired network. For example, the network encrypted content may be received from a satellite television provider, a cable television provider, from a terrestrial transmission, from a cellular network provider, or from a server over the Internet. In embodiments, the network encrypted content is content that may be transmitted to multiple different devices. As such, the network encrypted content may be encrypted using a network control word that is common to all devices receiving the content. Upon receiving the network encrypted content, flow continues to operation 404 where the network encrypted content is decrypted using a secure processing device and/or secure processor. In such embodiments, the network encrypted content may be provided to the secure processing device and/or secure processor at operation 404. In one embodiment, the network encrypted content may be provided to the secure processor for decryption as it is received over a network. In another embodiment, the network encrypted content may be buffered prior to decryption by the secure processor.

As previously described, the secure processing device and/or secure processor may be part of the device performing the method 400 or may be a removable component of the device performing the method 400 (e.g., a smart card). In embodiments where the secure processor and/or secure processing device is a removable component, the secure processor and/or secure processing device may have a form factor such that it is compatible with legacy systems. For example, a smart card may have the form factor to operate in an ISO-7816 mode (or any other type of mode) in addition to a mode that supports the systems and methods for performing Transport I/O disclosed herein.

In one embodiment, the network encrypted content may be provided to the secure processor in an unfiltered manner. For example, one or more unfiltered MPEG Transport Streams may be provided. In such embodiments, the MPEG Transport Streams may be provided as received, without the prior removal of packets identified by packet identifiers (PIDs). In another embodiment, the device may filter the network encrypted content before decrypting the network encrypted content using a secure processor. For example, one or more filtered MPEG Transport Streams may be provided to the secure processor for decryption by removing some packets identified by PIDs. In yet another embodiment, multiple streams may be multiplexed and provided to the secure processor for decryption. For example, two or more MPEG Transport Streams may be multiplexed to create a combined stream. The combined stream may be provided to the secure processor for decryption.

In embodiments, the decryption operation 404 may also perform the method 200 discussed with respect to FIG. 2. In such embodiments, the result of the operation 404 may also yield locally encrypted content. Flow continues to operation 406 where the locally encrypted content is decrypted. In embodiments, the method 300 described with respect to FIG. 3 may be employed at operation 406 to decrypt the locally encrypted content. In embodiments, decryption of the locally encrypted content is performed by a component on the device performing the method 400 that is not part of the secure processor. For example, the decryption may be performed by a general processor. In embodiments, decrypting locally encrypted content may yield a stream of unencrypted content.

Flow continues to operation 408 where the clear content is processed. In one embodiment, clear content may be processed by providing the content to a display and/or audio device that is part of or connected to the device performing the method 400. In another embodiment, the clear content may be stored in memory or non-volatile storage at operation 408. One of skill in the art will appreciate that any type of processing of the clear content may be performed at operation 408.

As described with respect to embodiments of the method 400 a device performing the method may include different components to perform the different operations of the method 400. For example, decryption of the network encrypted content may be performed by a secure component that is part of the device. In embodiments, the secure component may be removable, such as a smart card. The local decryption and processing operations may be performed by components other than the secure component. However, because the decryption of the network encrypted content is performed by the secure component, the network control word is not vulnerable to interception and sharing. Thus, the method 400 is a more secure process of decrypting network encrypted content without exposing the one or more keys required to decrypt the network encrypted content.

In embodiments where the secure processor is removable, such as, but not limited to, a smart card, different data rates may be employed when the device performing the method 400 communicates with the removable secure processor. In one embodiment, a fixed data rate may be used for all communications between the device and the removable secure processor. In another embodiment, the data rate may be variable dependent upon the type of content and/or the type of messages exchanged between the device and the removable secure processor. In further embodiments, different types of signaling may be employed to communicate between the device and the removable secure processor. For example, in embodiments where the removable secure processor is a smart card, low-voltage differential signaling (LVDS) may be employed.

In further embodiments, the method 400 may be performed simultaneously on different network content to process multiple network encrypted streams or multiple pieces of network encrypted content. For example, in a set-top-box environment, the device may be able to process multiple data streams at a time. For example, a set-top-box may allow a user to watch one channel while recording one or more other channels. In such embodiments, the set-top-box may simultaneously employ the method 400 on multiple streams to decrypt the network encrypted content. In such embodiments, the removable secure processor, e.g., smart card, is capable of simultaneously decrypting multiple network encrypted content streams and creating multiple different locally encrypted streams. In such embodiments, different network control words may be used to decrypt the different network encrypted content and different local control words may be used to create different locally encrypted content.

Figure 5:
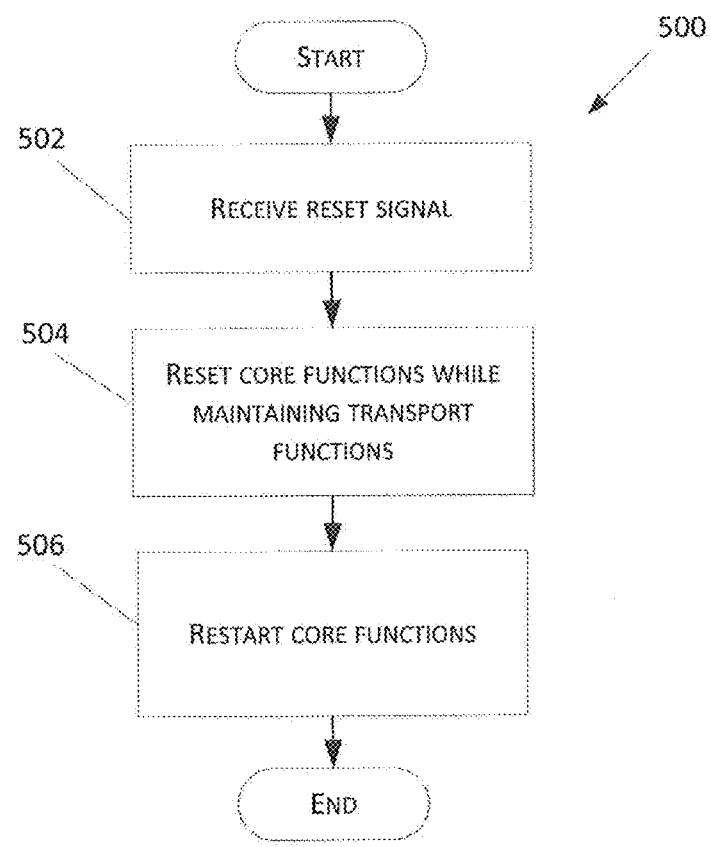
FIG. 5 is an embodiment of a method 500 that may be employed to reset functionality of a secure device.

FIG. 5 is an embodiment of a method 500 that may be employed to reset functionality of a secure device, such as, for example, a smart card, while maintaining transport stream functionality. Flow begins at operation 502 where the secure device receives an instruction to reset. In embodiments, the instruction may indicate that core functionality are to be reset independently from transport functionality. For example, core functionality may relate to the operating instructions, e.g., the core software, for the operating of the secure device. For example, the core software may be reset to, e.g., perform a software upgrade, to recover from a malfunction, or due to a lack of synchronization, etc. However, because the secure device processes network encrypted streams, unlike prior solutions where network encrypted streams were processed by components that were not part of the secure device, the secure device must be reset without interrupting streamed data. In the embodiments described herein, if the secure device is completely reset, the processing of the streamed data may be interrupted during the reset. In embodiments, the signal received at operation 502 may indicate a partial reset (e.g., resetting only core functionality and/or software) or the secure device may make a determination to perform a partial reset.

Flow continues to operation 504 where the secure device resets the core functionality while maintaining the transport functionality. In embodiments, the components of the secure device that perform the core functionality may be reset while the components that perform the transport functionality continue to operate. As such, maintenance may be performed on the core functionality of the secure device without interrupting the processing of data streams received by the secure device. For example, while the core functionality of the secure device are reset, the secure device may still able to receive transport data, process the transport data (e.g., by performing the method 200 from FIG. 2), and provide the processed packets (e.g., locally encrypted content) to another device. By performing the partial reset, network encrypted content may still be decrypted and locally encrypted during a reset of the device, thereby providing the ability of the secure device to continually provide content while performing maintenance. Flow then continues to operation 506 where the core functionality of the secure device are restarted and the maintenance is completed.

Figure 6:
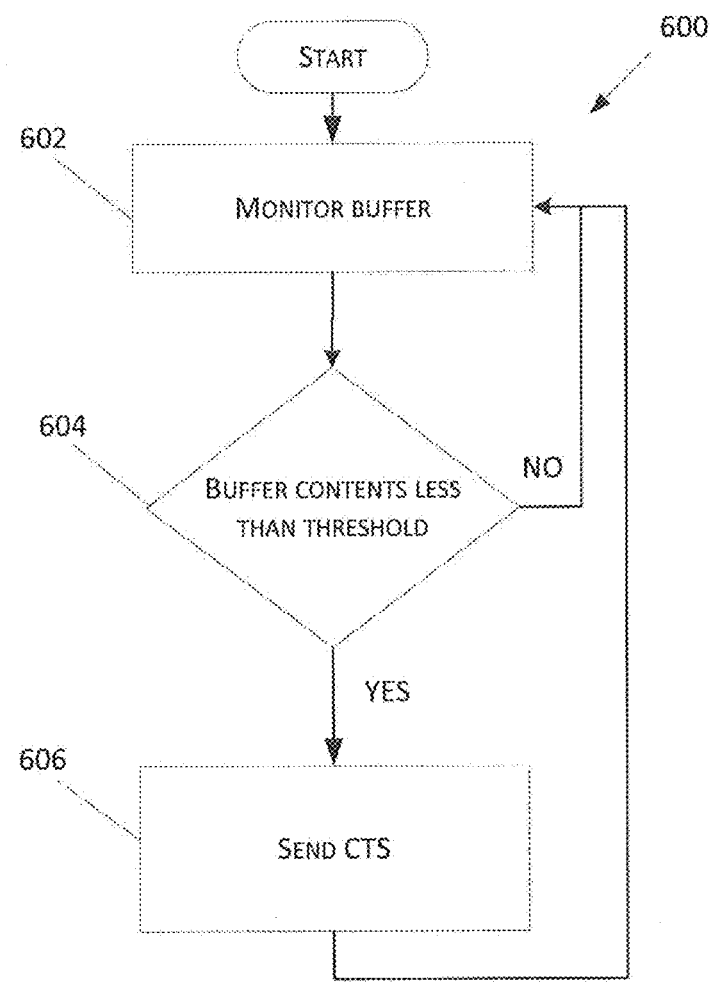
FIG. 6 is an embodiment of a packet pacing method 600.

In embodiments, because the secure device is processing network data, e.g., the network encrypted content, variable bandwidth data is provided to the secure device. This differs from prior systems in which a secure device, e.g., a smart card, received a fixed bandwidth amount of data. In order to deal with variable bandwidth data, embodiments of the secure devices disclosed herein may perform a packet pacing algorithm. FIG. 6 is an embodiment of a packet pacing method 600 that may be employed by a secure device operating in a variable bandwidth environment. In embodiments, the method 600 is a closed loop feedback mechanism whereby a secure device may provide a clear to send (CTS) message or signal to notify that the device communicating with the secure device, e.g., a set-top-box or system on a chip, is allowed to send additional packets of data to the secure device. In embodiments, the method 600 may be employed to ensure that the secure device is capable of extracting a variable amount of data from multiple fixed input streams while throttling the amount of effective data by employing one or more CTS messages. In embodiments, sending a CTS message or signal by the secure device to a device it is communicating with triggers the device to send packets of interest (e.g., packets containing useful data such as transmission data, control data, etc.). In an embodiment, when the secure device does not send a CTS message, the secure device may receive stuffing packets from the device it is communicating with.

In embodiments, the secure device may employ a first-in-first-out (FIFO) buffer to perform packet pacing. The secure device may monitor the FIFO buffer to control the packet pacing of the variable bandwidth data received by the secure device. For example, the secure device may monitor the capacity and/or fullness of the FIFO buffer. If the number of packets queued in the FIFO fall below a threshold, the secure device may send a CTS message to a device communicating with the secure device to trigger receipt of additional data. In embodiments, a low level of data may be maintained in the FIFO buffer to ensure minimal latency for queued live packets that have a high priority. During periods of high activity, the secure device may ensure that live packets get higher priority by maintaining a small FIFO buffer.

Flow begins at operation 602 where the FIFO buffer is monitored. Monitoring the FIFO buffer may comprise checking the number of items in the FIFO buffer. In embodiments, any method of monitoring a buffer or the contents of a buffer may be performed at operation 602. Flow continues to decision operation 604, where a determination is made as to whether the number of contents in the FIFO buffer is lower than a predetermined threshold. In one embodiment, the threshold may be based upon processing time for a packet in the buffer. In another embodiment, the threshold may be based upon a calculation. If the number of items in the FIFO buffer is lower than the threshold, FIG. 6 shows that flow branches "YES" to operation 606 where a CTS message or signal is sent to trigger the receipt of additional data packets and flow returns to operation 602. For example, the CTS message may be sent to a video processing device, a set-top-box, or other type of device instructing the device to send additional data to the secure processor. If the number of items is not lower than the threshold, FIG. 6 shows that flow branches "NO" and returns to operation 602. Although embodiments have been described with a FIFO buffer, other types of queues may be employed without departing from the scope of the present disclosure.

Figure 7:
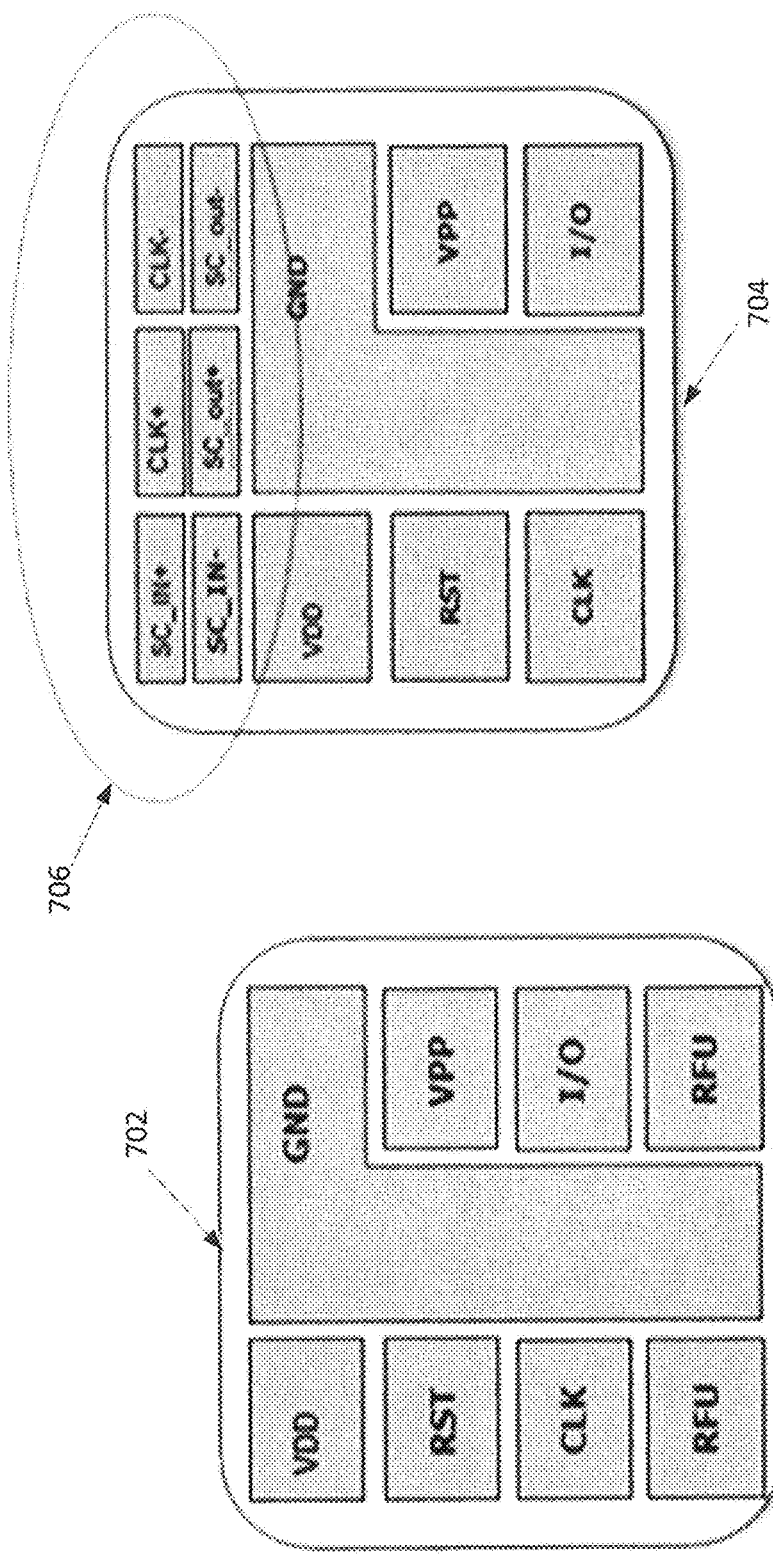
FIG. 7 is an embodiment illustrating the compatibility between an ISO-7816 smart card and a smart card capable of supporting the systems and methods disclosed herein.

In embodiments where the secure processor is a removable component, the secure processor may be designed such that it is capable of working in legacy systems. In embodiments, the secure processor is a removable component that has a legacy form factor. For example, a smart card may be designed to support both ISO-7816 signals and signals for the Transport I/O system described herein. FIG. 7 is an embodiment illustrating the compatibility between an ISO- 7816 smart card and a smart card capable of supporting the systems and methods disclosed herein. Smart card 702 is an embodiment of an ISO-7816 compatible smart card. Smart card 704 is a smart card compatible with both ISO-7816 and the Transport I/O systems and methods disclosed herein. In the illustrated embodiment, smart card 704 includes all of the contacts necessary to be compatible with the ISO-7816 standard (e.g., supports a legacy form factor). Additionally, smart card 704 includes six contacts, identified by the ellipse 706 that may be used to perform the systems and methods described herein. In such embodiments, the smart card 704 may be capable of working with both existing systems (e.g., legacy devices deployed to the field) and Transport I/O capable systems.

In embodiments, the device performing the method 400 and/or the removable secure device may make a determination as to whether to operate in a legacy mode (e.g., an ISO-7816 mode) or in a Transport I/O system compatible mode at start up. In one embodiment, the determination may be made based upon a signal sent to the removable secure device at initialization. Further details regarding the making of such determination is provided in U.S. patent application Ser. No. 13/184,831 entitled, "Multiple-Speed Interface," filed on Jul. 18, 2011, which claims priority to U.S. Provisional Patent Application No. 61/364,854, filed on Jul. 16, 2011, which is hereby incorporated by reference in its entirety.

Figure 8:
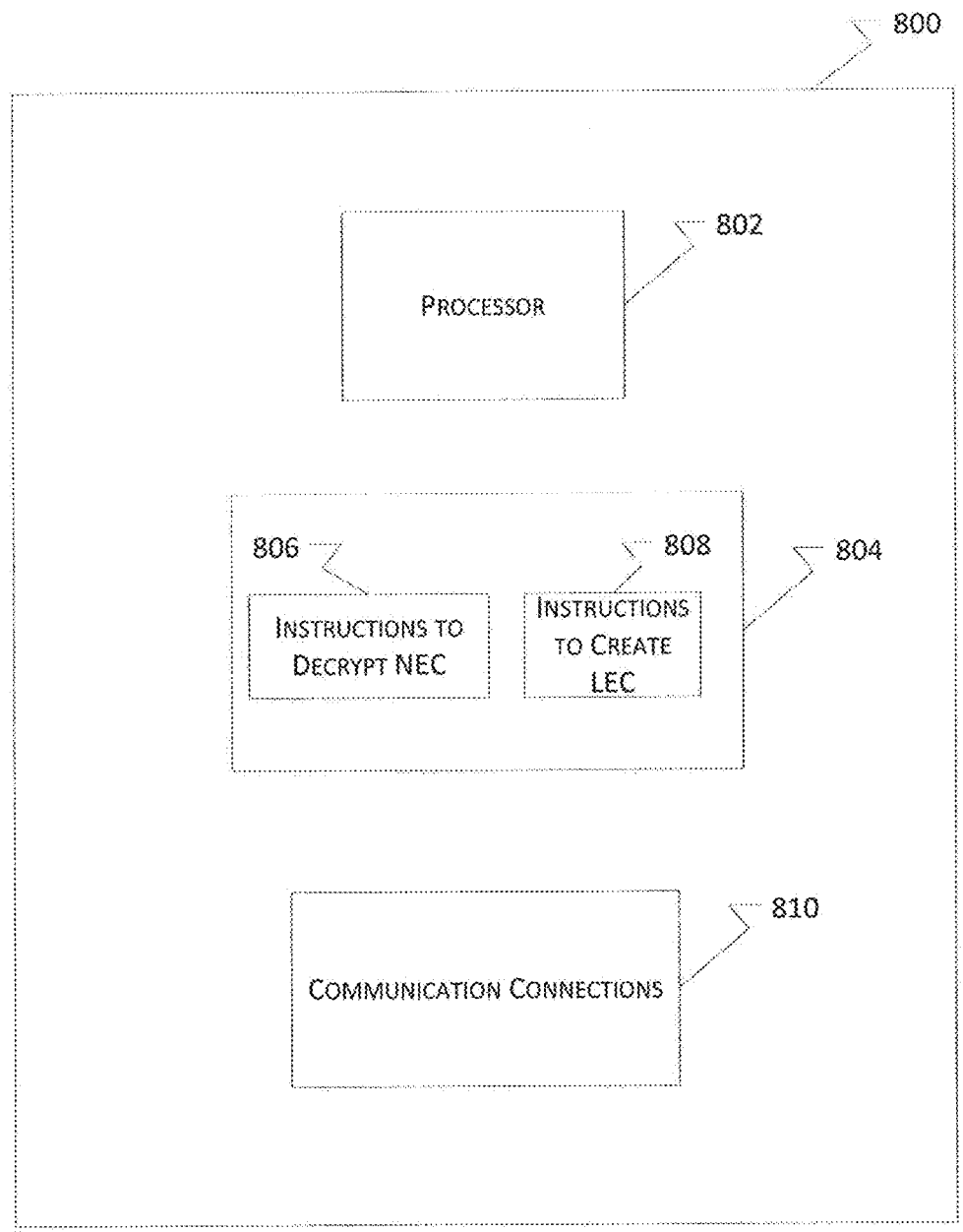
FIG. 8 is an embodiment of a secure processing device 800 that may be employed with the systems or to perform the methods disclosed herein.

FIG. 8 is an embodiment of a secure processing device 800 that may be employed with the systems or to perform the methods disclosed herein. In embodiments, the secure processing device may be a smart card. However, one of skill in the art will appreciate that any other type of secure device may be employed with the systems and methods disclosed herein. In embodiments, the secure processing device may be part of a device performing the method 400 described with respect to FIG. 4. In another embodiment, the secure processing device 800 may be a removable component of a device performing the method 400.

In embodiments, secure processing device 800 includes one or more processing units 802. In some embodiments, one or more components of the methods described herein are performed by the one or more processing units 802. For example, the one or more processing units 802 may be used to decrypt network encrypted content, create locally encrypted content, and create non-content data as described in the method 200 of FIG. 2.

Secure processing device 800 may also include memory 804. Memory 804 includes, but is not limited to, RAM, ROM, EEPROM, flash memory or other memory technology, or any other tangible medium which is used to store information and which is accessed by secure processing device 800 and one or more processing units 802. Memory 804 may store executable instructions to perform the methods disclosed herein. For example, memory 804 may include instructions to decrypt network encrypted content (NEC) 806. Memory may also store the instructions to encrypt clear content to create locally encrypted content (LEC) 808.

Secure processing device 800 may also contain communications connection(s) 810 that allow the device to communicate with other devices. Communication connection(s) 810 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media. In embodiments, network encrypted content such may be received over communications connection(s) 810. Locally encrypted content may be transmitted over communications connection(s) 810. In still further embodiments, the instructions to perform the Transport I/O methods described herein may be received via communications connection(s) 810. For example, a head-end may update secure processing device 800 with instructions to perform the methods disclosed herein. The instructions may be stored in memory 804. Communications connection(s) 810 thereby allows a head-end to update smart cards deployed in the field with instructions to perform the methods disclosed herein. Communications connections also provide the secure processing device 800 with the ability to receive network encrypted content from a device and return locally encrypted content to the device. In embodiments, communication connections may be pads on a smart card, such as, but not limited to, the pads identified as Transport I/O capable pads 706 in FIG. 7.

Although the embodiment of the secure processing device 800 is illustrated as having memory 804 that includes instructions to perform the methods disclosed herein, in alternate embodiments, the instructions to perform the methods disclosed herein may be performed by an application specific integrated circuit (ASIC) that is part of the secure processing device 800.

Figure 9:
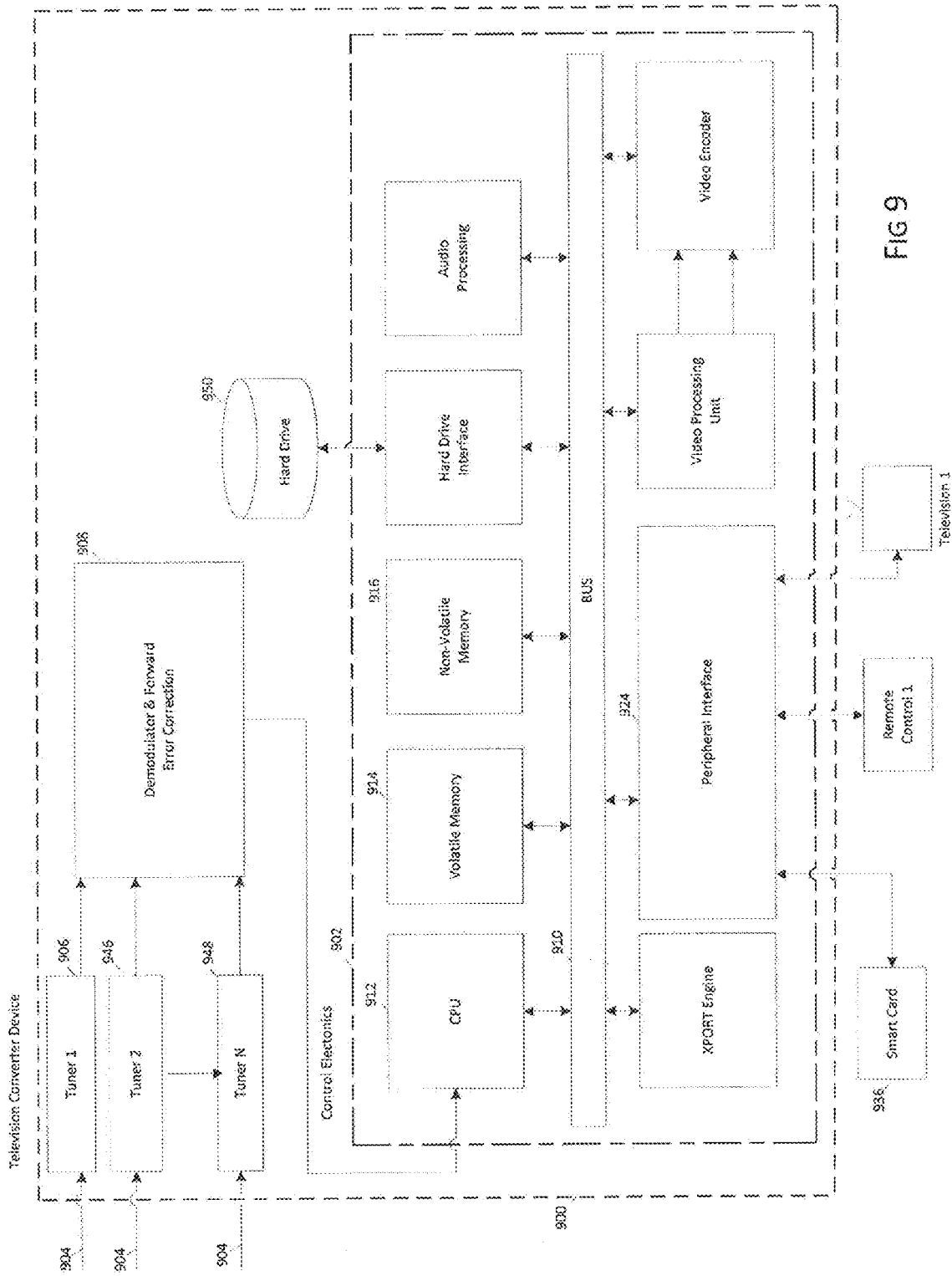
FIG. 9 is an embodiment of a set-top-box that may be used to perform the Transport I/O system methods and be part of the systems disclosed herein.

FIG. 9 is an embodiment of a set-top-box that may be used to perform the Transport I/O system methods and be part of the systems disclosed herein. In another embodiment, different recipient devices such as, but not limited to, a smart phone, a tablet computer, a laptop, or any other type of device may be employed containing some of the components illustrated in FIG. 9. While FIG. 9 is illustrated with various components, many of the components are known to the art and do not need explanation. Only the components that may be used to perform the methods disclosed herein are described. The signal 904 that arrives at the set-top-box 900 may undergo extensive processing. The television converter 900 may include one or more tuner devices 906, 946, 948 that may receive a signal 904. Signal 904 may be a satellite signal, a cable signal, or any other type of signal received over a wired or wireless network. In this embodiment, tuner devices 906, 946, 948 acquire a signal 904 from a head-end or content provider. Tuner devices 906, 946, 948 may initially process the signal 904. Signal 904 may be a data stream that comprises network encrypted content (e.g., one or more multiple network encrypted streams), multiple clear content (e.g., one or more multiple clear content streams) and/or metadata containing information about the data stream or the multiple encrypted and/or clear streams that make up the data stream. Tuner device 906, 946, 948 may also receive subscriber commands in the form of signals from control electronics unit 902. Signals from control electronics unit 902 may include, but is not limited to, a signal to tune to a transponder as part of the process of selecting a certain channel for viewing on a peripheral device. One skilled in the art would recognize that the tuner devices 906, 946, 948 may include fewer, more, or different components. The signal 904 may include content encoded by a network control word. The signal 904 may also include one or more ECMs and EMMs.

After receiving the signal 904, one of the first steps may be to demodulate 908 the signal 904. The signal 904 may arrive as an analog signal that "carries" data (e.g., data is modulated onto the analog signal). Demodulation 908 may be accomplished by reversing the modulation process. Modulation can be done in several ways. Modulation may include amplitude modulation (AM) or frequency modulation (FM). If the carried data is digital, modulation methods include, but are not limited to, biphase-shift keying (BPSK), quadraphase-shift keying (QPSK), or eight-phase shift keying (8PSK). One skilled in the art will recognize that other methods of modulating and demodulating the signal 904 may be possible. Another one of the first steps may also be to error correct 908 signal 904. One example of error correcting 908 is forward error correction (FEC). FEC 908 may include, but is not limited to, inspecting parity bit or bits that may accompany signal 904. One skilled in the art will recognize that many methods for error correcting are possible. For the purposes of discussion, an embodiment using digital data will be discussed below. However, one skilled in the art will recognize that systems with analog data or combined analog and digital data are also possible and contemplated herein.

In embodiments, set-top-box 900 contains control electronics unit 902 that receives signal 904. In embodiments, the control electronics unit 902 may comprise a smart card interface. One skilled in the art will recognize that control electronics 902 may receive other signals, including, but not limited to, signals from a cable, satellite, or broadcast television distributor. In this embodiment, control electronics unit 902 includes discrete electronic components combined into a single circuit with a shared bus 910. In other embodiments, control electronics unit 902 may be configured differently. For example, one or more of the control electronics unit 902 components in set-top-box 900 may be combined or omitted. As a further example, one or more of the control electronics unit 902 components in set-top-box 900 may not share a bus 910, but may nonetheless be operatively connected by some other means. One skilled in the art will recognize that other configurations of set-top-box 900 and control electronics unit 902 are possible and within the scope of this invention. One skilled in the art will further recognize that some components of set-top-box 900 and control electronics unit 902 may be implemented in hardware or software. The control electronics unit 902 may operate under the control of a software program, firmware program, or some other program stored in memory or control logic. One skilled in the art will also recognize that the control electronics unit 902 may include other electronic components or structures to mediate or process signals.

Control electronics unit 902 may contain one or more central-processing-units (CPUs) 912 or processors. In this embodiment, control electronics unit 902 contains a single CPU 912 that is operatively connected to the shared bus. In this embodiment, CPU 912 may be used, among other things, for logical operations for set-top-box 900 functions including, but not limited to, channel selection, recording control, EPG display and control and system maintenance. One skilled in the art will recognize that the CPU 912 may be integrated with memory or other discrete electronics components. In embodiments, CPU 912 may be used to perform the systems and methods disclosed herein. For example, CPU 912 may be used to perform a method of decrypting locally encrypted content as described with respect to FIG. 3. However, in embodiments, local decryption may be performed by other components, such as a dedicated crypto engine (not shown). One of skill in the art will appreciate that although specific components are described with respect to FIG. 9, the system and methods disclosed herein may be performed by other components or other types of devices without departing from the spirit of this disclosure.

Control electronics unit 902 may contain one or more volatile memory components 914. Volatile memory components 914 may include, but are not limited to, one or more SDRAM memory chips. Similarly, control electronics unit 902 may also contain one or more non-volatile memory components 916. Non-volatile memory 916 may include one or more memory chips, including, but not limited to, ROM, EEPROM, and Flash. One skilled in the art will recognize that volatile memory 914 and non-volatile memory 916 may be integrated within other electronics components. One skilled in the art will also recognize that other memory components may be included within set-top-box 900 and control electronics unit 902. One skilled in the art will recognize that memory 914, 916 may be used for many purposes, including, but not limited to, storing EPG data and storing data for use by CPU 912. In embodiments, the Volatile memory components 914 and/or one or more non-volatile memory components 916 may be used to store the instructions to perform methods 300 and 400 disclosed herein. Non-volatile memory 916 may be used to store locally encrypted content or clear content. In other embodiments, hard drive 950 may be used to store locally encrypted content or clear content.

A set-top-box 900 may be connected to one or more peripheral electronic devices through peripheral interface 924. These peripheral devices may include a smart card 936. In embodiments, the smart card 936 acts as a conditional access system. In such embodiments, the smart card 936 performs the methods 200 and 400 disclosed herein. In embodiments, smart card 936 may be a smart card such as smart card 504 that is capable of supporting both a legacy mode of operation and a Transport I/O mode of operation. In still further embodiments, smart card 936 may have the components described with respect to FIG. 8. Peripheral interface 924 may also act as an I/O connection to provide the clear content to a display device, such as, but not limited to, a television and speakers.

Figure 10:
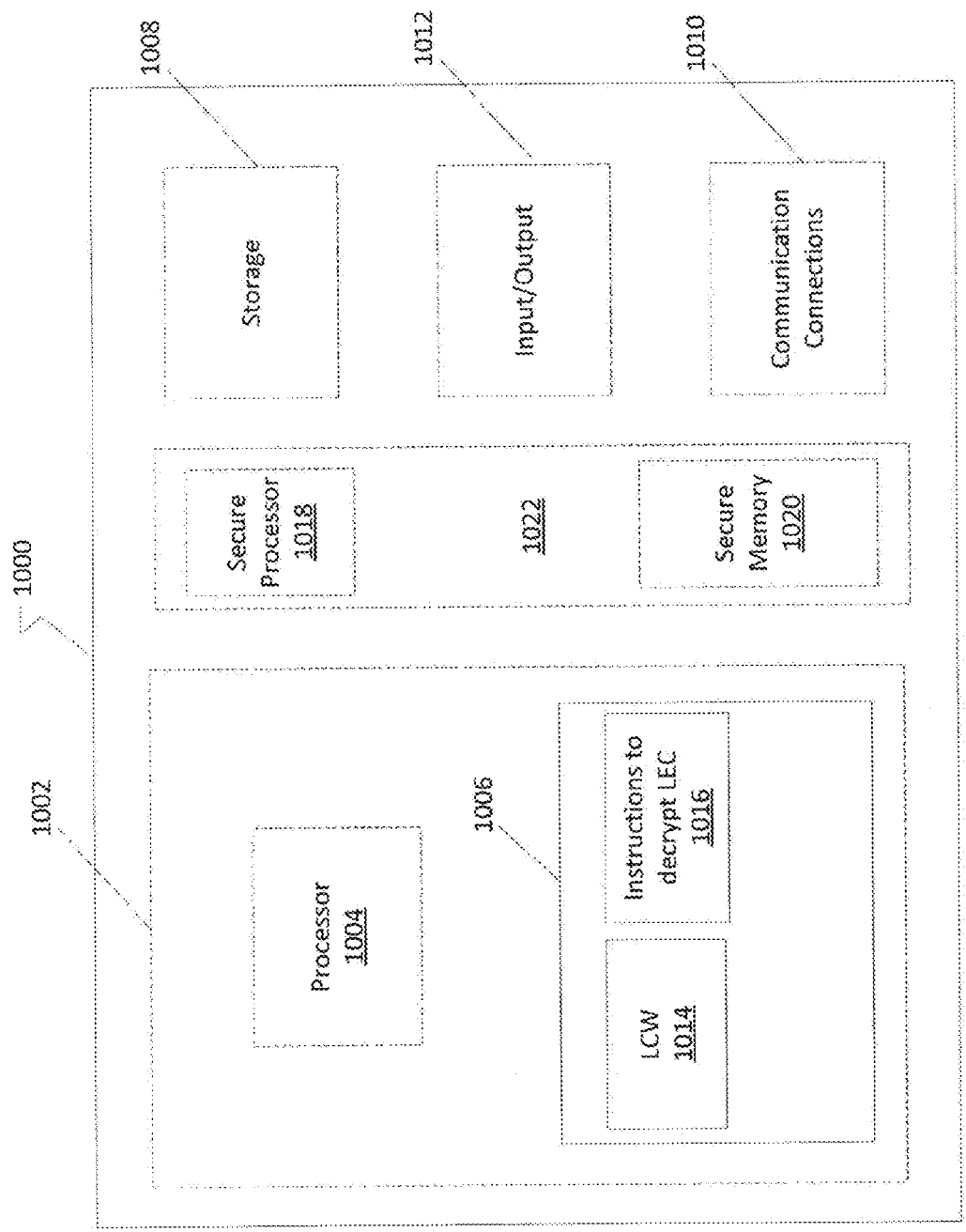
FIG. 10 illustrates an embodiment of a computer environment and computer system 1000 for implementing the systems and methods disclosed herein.

With reference to FIG. 10, an embodiment of a computing environment for implementing the various embodiments described herein includes a computer system, such as computer system 1000. Any and all components of the described embodiments (such as the DVR, the content storage sever, a laptop, mobile device, personal computer, a smart phone, a secure processing device, etc.), may execute as or on a client computer system, a server computer system, a combination of client and server computer systems, a handheld device, and other possible computing environments or systems described herein. As such, a basic computer system applicable to all these environments is described hereinafter.

In its most basic configuration, computer system 1000 comprises at least one processing unit or processor 1004 and system memory 1006. The most basic configuration of the computer system 1000 is illustrated in FIG. 10 by dashed line 1002. In some embodiments, one or more components of the described system are loaded into system memory 1006 and executed by the processing unit 1004 from system memory 1006. Depending on the exact configuration and type of computer system 1000, system memory 1006 may be volatile (such as RAM), non-volatile (such as ROM, flash memory, etc.), or some combination of the two.

Additionally, computer system 1000 may also have additional features/functionality. For example, computer system 1000 may include additional storage media 1008, such as removable and/or non-removable storage, including, but not limited to, magnetic or optical disks or tape or solid state storage. In some embodiments, software or executable code and any data used for the described system is permanently stored in storage media 1008. Storage media 1008 includes volatile and non-volatile, removable and non-removable media implemented in any method or technology for storage of information such as computer readable instructions, data structures, program modules, or other data.

System memory 1006 and storage media 1008 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, solid state storage or any other tangible medium which is used to store the desired information and which is accessed by computer system 1000 and processor 1004. Any such computer storage media may be part of computer system 1000. In some embodiments, system memory 1006 and/or storage media 1008 may store data used to perform the methods or form the system(s) disclosed herein. In other embodiments, system memory 1006 may store information such as the local control word 1014 and logic 1016 to perform the methods of decrypting locally encrypted content as described herein.

Computer system 1000 may also contain communications connection(s) 1010 that allow the device to communicate with other devices. Communication connection(s) 1010 is an example of communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media. In an embodiment, content and metadata may be transmitted over communications connection(s) 1010.

In some embodiments, computer system 1000 also includes input and output connections 1012, and interfaces and peripheral devices, such as a graphical user interface. Input device(s) are also referred to as user interface selection devices and include, but are not limited to, a keyboard, a mouse, a pen, a voice input device, a touch input device, etc. Output device(s) are also referred to as displays and include, but are not limited to, cathode ray tube displays, plasma screen displays, liquid crystal screen displays, speakers, printers, etc. These devices, either individually or in combination, connected to input and output connections 1012 are used to display the information as described herein. All these devices are well known in the art and need not be discussed at length here. In further embodiments, the input and output connections 1012 may be used to communicate with a removable secure processor, such as, but not limited to, a smart card.

In further embodiments, computer system 1000 may include a secure processor 1018 and secure memory 1020 that may be used to perform some of the methods disclosed herein. In embodiments, the secure processor 1018 and secure memory 1020 of the computer system 1000 may comprise a secure area 1022 that is not generally accessible by the other components of computer system 1000 or by other processes executing on the computer system 1000. In embodiments, secure memory may store instructions to decrypt network encrypted content and create locally encrypted content as described with respect to FIG. 2. Such instructions may be executed by the secure processor 1018. In such embodiments, network control words may remain within the secure area 1022, thereby reducing the chance of interception and sharing by unauthorized parties.

In some embodiments, the components described herein comprise such modules or instructions executable by computer system 1000 that may be stored on computer storage medium and other tangible mediums and transmitted in communication media. Computer storage media includes volatile and non-volatile, removable and non-removable non-transitory media implemented in any method or technology for storage of information such as computer readable instructions, data structures, program modules, or other data. Combinations of any of the above should also be included within the scope of readable media. In some embodiments, computer system 1000 is part of a network that stores data in remote storage media for use by the computer system 1000.

Sometimes, conditional access systems have required the use of bulky and expensive form factors. For example, the traditional DVB-CI Conditional Access Module (CAM) uses a PCMCIA (PCCARD) form factor and connector along with a standard ISO-7816. The number of devices capable of receiving and presenting content (e.g., video and/or audio content) continues to grow. For example, many smartphones, laptops, tablets, phablets, televisions, and other devices are capable of receiving and presenting content to a user. Generally, such devices do not include traditional conditional access system interfaces due to the form factor and cost of such interfaces. As such, content providers and distributers cannot rely on traditional conditional access systems (e.g., the use of smart cards, PC cards, etc.) to protect their content on these devices.

Furthermore, due to cost and form factor issues, many device manufacturers are unwilling to include traditional conditional access system interfaces. However, many of such devices include other standard interfaces and/or connections. The embodiments disclosed herein leverage standard connections to employ conditional access smartchips capable of interacting with many different types of devices. One such standard interface is the USB 3.0 interface. However, while the embodiments disclosed herein describe the use of a smartchip with a USB 3.0 connector, one of skill in the art will appreciate that other interfaces and/or connectors may be employed by the embodiments disclosed herein without departing from the scope of this disclosure.

Figure 11:
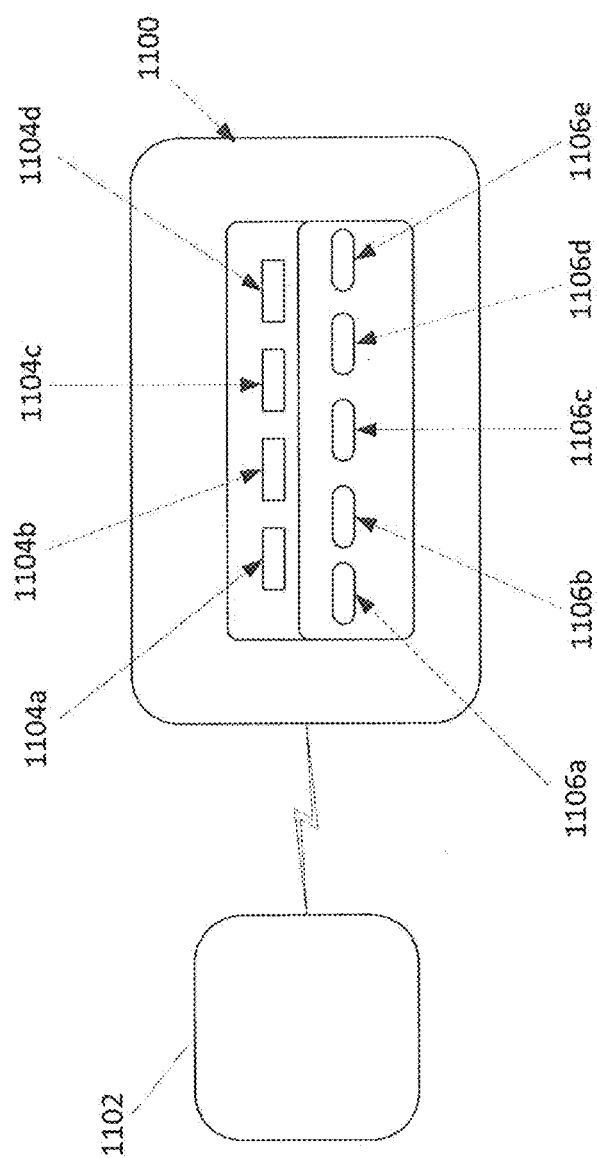
FIG. 11 illustrates an exemplary connector 1100 that may be used in conjunction with a smartchip.

FIG. 11 illustrates an exemplary connector 1100 that may be used in conjunction with a smartchip 1102, such as a Transport I/O capable smartchip, to perform conditional access. In embodiments, the smartchip 1102 may perform the methods disclosed herein. For the sake of illustration, the exemplary connector 1100 is described as a USB 3.0 connector. However, while the exemplary connector 1100 is described using a USB 3.0 connector, one of skill in the art will appreciate that other standard connections (e.g., a USB 2.0 connection, a mini USB connection, a SCSI connection, IEEE 1394 connections, etc.) may be utilized by the embodiments disclosed herein to perform Transport I/O conditional access. In such embodiments, the other standard connectors may be modified to transmit data and/or messages during Transport I/O conditional access.

Exemplary connector 1100 includes 9 signal pins. In embodiments, signal pins 1104a-d may operate and/or be utilized in accordance with the USB 2.0 protocol. For example, signal pin 1104a may be utilized as a ground pin, signal pin 1104b may be utilized as a Data+ pin, signal pin 1104c may be utilized as a Data− pin, and signal pin 1104d may be utilized as a VCC pin, as defined by the USB 2.0 standard. Signal pins 1106a-e may be signal pins that may operate and/or be utilized in accordance with the USB 3.0 protocol. However, in embodiments, a smartchip 1102 capable of performing the Transport I/O methods disclosed herein may map pins 1106a-e to the smart card contacts 706 that are included as part of the Transport I/O smart card 704 described with respect to FIG. 7. For example, the USB 3.0 specification defines pins 1106a and 1106b as the Receive− and Receive+ pins, respectively. A smartchip 1102 capable of performing the embodiments disclosed herein, however, may utilize pins 1106a and 1106b as the SC_out− and SC_out+ contacts, respectively, as described with respect to smart card 704 of FIG. 7. Similarly, the USB 3.0 protocol defines pins 1106d and 1106e as the Transmit− and Transmit+ pins, respectively. Again, in embodiments, a smartchip 1102 capable of performing the embodiments disclosed herein, however, may utilize pins 1106d and 1106e as the SC_IN− and SC_IN+ contacts, respectively, that are part of smart card 704 of FIG. 7. As such, a smartchip 1102 may leverage the USB 3.0 form factor to be part of a Transport I/O system and/or to perform the Transport I/O methods disclosed herein.

Exemplary connector 1100, however, does not have enough pins to directly map to all of the Transport I/O contacts 706 illustrated in FIG. 7. After mapping pins 1106a and 1106b to SC_out− and SC_out+ and pins 1106d and 1106e as the SC_IN− and SC_IN+ pads discussed with respect to smart card 704 (FIG. 7), only pin 1106c (defined as a ground by the USB 3.0 standard) remains unmapped. However, smart card 704 (FIG. 7) includes two additional pads, the CLK+ and CLK− pads. The CLK+ and CLK− pads are used for synchronization of data between smart card 404 and a set-top-box, a system on a chip (SoC), or any other type of device capable of receiving and modifying content. In embodiments, because the content (e.g., video content, television content, audio content, etc.) is continually streamed between smart card 704 (FIG. 7) and another device, a clock signal may be used to synchronize communications between the smart card 704 (FIG. 7) and another device. However, exemplary connector 1100 does not have enough available pins to transmit a clock signal in a similar manner as the smart card 704 (FIG. 7). In order to synchronize communication between a smartchip 1102 and a SoC, a device, a laptop, etc., via connector 1100, a clock recovery mechanism may be employed. In embodiments, a smartchip 1102 utilizing connector 1100 to perform the Transport I/O embodiments disclosed herein may transmit and receive self-clocking data. In embodiments, the clock recovery mechanism may utilize phase-locked looping, 8B/10B encoding, eight-to-fourteen modulation, or any other type of clock recovery technique known to the art.

When a USB 3.0 device initializes (e.g., when it is first connected), the USB 2.0 pins (e.g., pins 1104a-d) are used to establish an initial connection. Upon initialization, the USB 3.0 device negotiates with the host to which it is connected to determine whether the host supports USB 3.0. If both devices support USB 3.0, the USB device and the host agree to enable the USB 3.0 pins (e.g., pins 1106a-e) and communications between the USB device and the host proceeds according to the USB 3.0 standard. A Transport I/O smartchip and/or device may also perform a negotiation to see if both devices are capable of supporting Transport I/O (or other types of) conditional access. For example, when a smartchip 1102 initially connects to a host device using connector 1100, pins 1104a-e may be used to establish a connection according to the USB 2.0 protocol. However, after the initial connection, instead of performing negotiation to determine whether USB 3.0 is supported by the host, the negotiation may be used to determine whether the host supports the Transport I/O embodiments disclosed herein. If so, pins 1106a and 1106b may be configured to transmit and/or receive data in a similar manner as the SC_out− and SC_out+ pads of the smart card 704 (FIG. 7). For example, network encrypted content may be transmitted to the smartchip using pins 1106a and 1106b. Similarly, pins 1106d and 1106e may be configured transmit and/or received data in a similar manner as the SC_IN− and SC_IN+ pads of the smart card 704 (FIG. 7). For example, locally encrypted content may be transmitted from the smartchip 1102 to the host using pins 1106d and 1106e.

Figure 12:
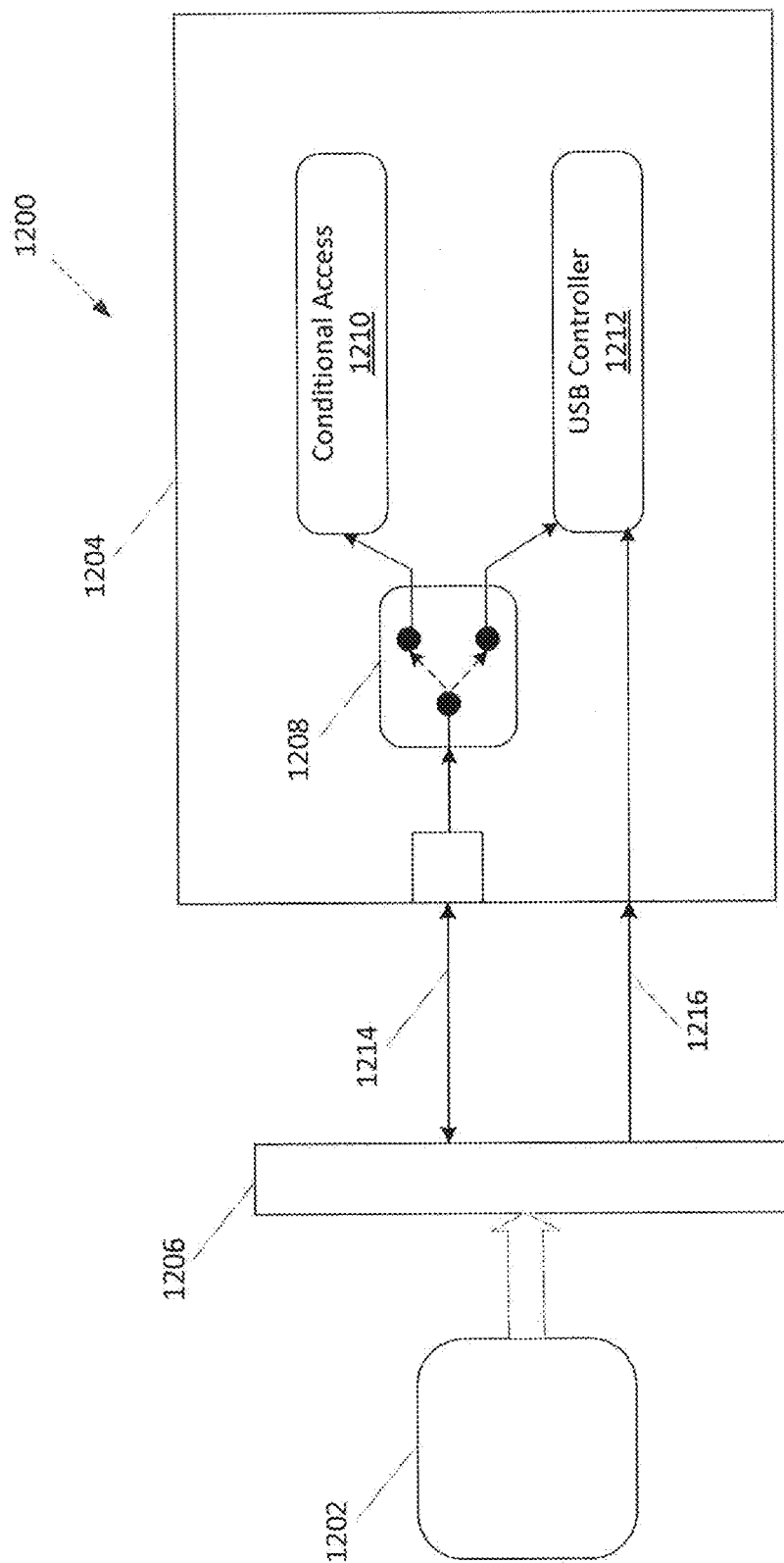
FIG. 12 is an embodiment of a conditional access system 1200 utilizing a connector.

FIG. 12 is an embodiment of a conditional access system 1200 utilizing a connector 1206. In embodiments, a smartchip 1202 may be connected to a conditional access SoC 1204 via a connector 1206. For ease of illustration, connector 1206 is described as a USB 3.0 connector in this disclosure. However, one of skill in the art will appreciate that other standard connections (e.g., a USB 2.0 connection, a mini USB connection, a SCSI connection, an IEEE 1394 connection, etc.) may be utilized with the embodiments disclosed herein. When the smartchip 1202 connects to the conditional access SoC 1204 via connector 1206, the smartchip 1202 and the conditional access SoC 1204 begin a negotiation to determine whether both devices support a conditional access mode. When both the smartchip 1202 and the conditional access SoC 1204 support a similar conditional access protocol (e.g., Transport I/O), then the high speed line(s) 1214 (e.g., communication lines using pins 1106a-e of FIG. 11), are configured to operate according to the conditional access protocol (e.g., Transport I/O protocol) and data path connector 1208 routes communications between a Conditional Access Controller 1210 and the conditional access smartchip 1202. Under such conditions, network encrypted content may be transmitted to the smartchip 1202 via communication lines 1214 and locally encrypted content or, in alternate embodiments, clear content, may be returned to the conditional access SoC via communication lines 1214. In such embodiments, communication line(s) 1216 may utilize the USB 2.0 pins to transmit additional data (e.g., command and control packets, reset signals, etc.) using the USB 2.0 protocol.

In alternate embodiments, if smartchip 1202 and conditional access SoC 1204 do not support the same conditional access protocol, data path connector 1208 routes communications via high speed line 1214 to USB controller 1212 and operations are performed according to the USB Protocol, e.g., data may be transferred between a device that includes conditional access SoC 1204 and a USB device. In alternate embodiments in which the connector 1206 uses a different interface and/or protocol (e.g., SCSI, IEEE 1394, etc.) data path connector 1208 may route data to a controller for that particular interface and/or protocol. As such, embodiments of the present disclosure provide that conditional access SoC 1204 that may be included in any type of device (e.g., a laptop, tablet, smartphone, television, etc.) and connected to an external device via a standard connection, such as a USB 3.0 interface, to facilitate connections to both conditional access components (e.g., smartchip 1202), and other types of components (e.g., a USB stick).

Figure 13:
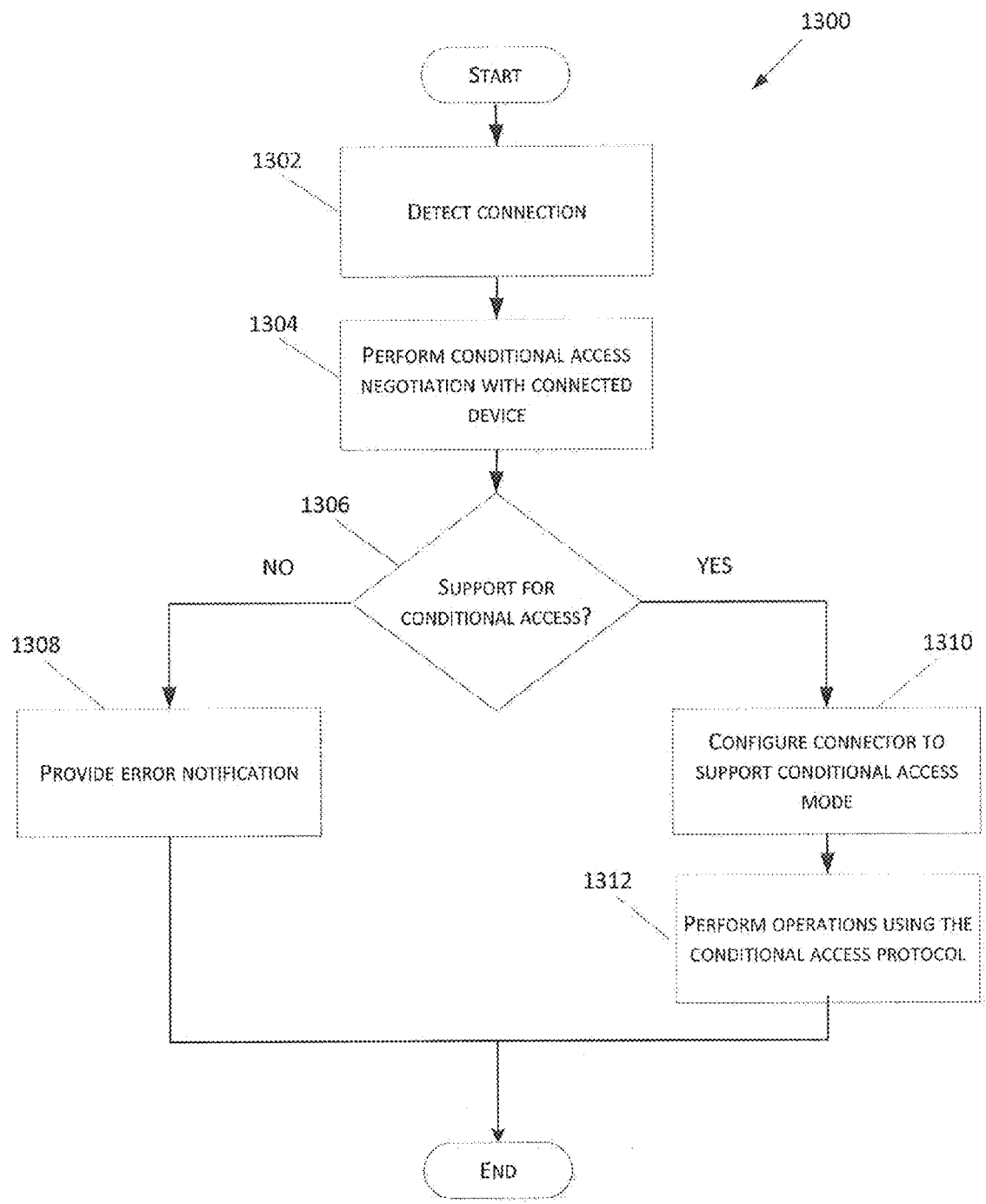
FIG. 13 is an embodiment of a method 1300 for determining whether to configure a connector for a conditional access mode.

FIG. 13 is an embodiment of a method 1300 for determining whether or not to configure a connector for a conditional access mode. The method 1300 may be implemented using software, hardware, or a combination of software and hardware. In embodiments, the method 1300 may be performed by a conditional access SoC, such as smartchip 1202 from FIG. 12. Flow begins at operation 1302 where a connection to another device is detected. For example, the connection may be detected by receiving a communication signal or power from an external device. One of skill in the art will appreciate that any method for detecting a connection known to the art may be performed at operation 1302. Flow continues to operation 1304, where negotiation takes place with the device to which the smartchip is connected. In embodiments, operation 1304 may include the smartchip exchanging information with the device that identifies whether or not the device supports conditional access protocol and/or whether the supported conditional access protocols are the same. Flow continues to decision operation 1306 where, based upon the negotiation, a determination is made as to whether the connected device and smartchip support a common conditional access protocol. If the device does not support conditional access, or does not support the same conditional access protocol, then flow branches NO to operation 1308 and an error notification may be generated or otherwise provided indicating that the device does not support conditional access. Alternatively, returning to decision operation 1306, if the device and the smartchip support the same conditional access protocol, such as, for example, the Transport I/O embodiments disclosed herein, then flow branches YES to operation 1310. At operation 1310, the connector is configured to support conditional access mode. For example, if the connector is a USB 3.0 connector, referring back to the example connector in FIG. 11, pins 1106a and 1106b may be configured as SC_out– and SC_out+ connections and pins 1106c and 1106d may be configured as the SC_IN– and SC_IN+ connections. Flow then continues to operation 1312, where operations are performed in accordance with the conditional access protocol. For example, at operation 1312, a Transport I/O smartchip (such as the exemplary smartchip 1102 of FIG. 11) may receive network encrypted content via pins 1106a and 1106b (FIG. 11), decrypt the network encrypted content, perform local encryption, and provide locally encrypted content via pins 1106c and 1106d (FIG. 11).

Figure 14:
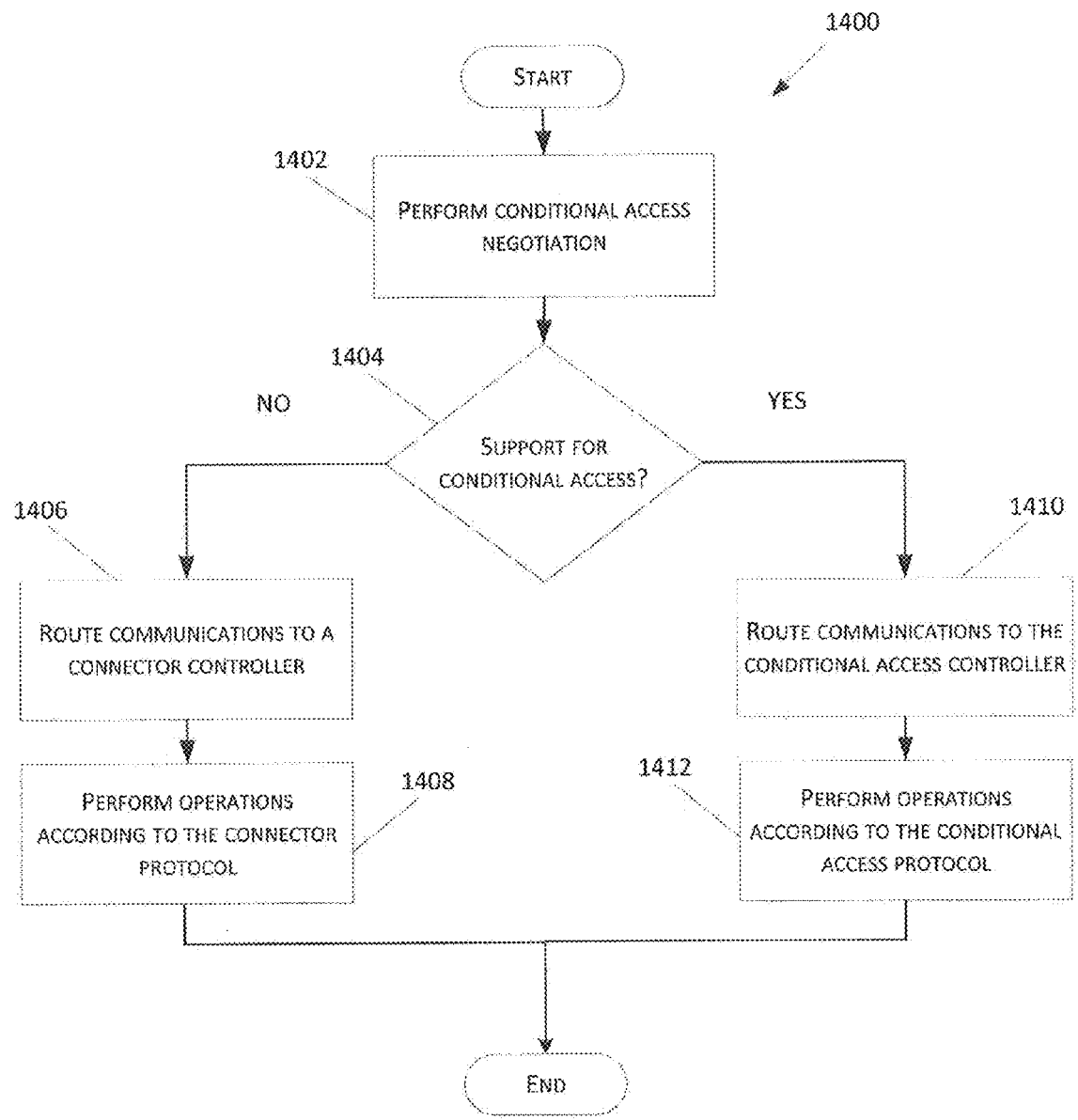
FIG. 14 is an embodiment of a method 1400 for determining whether to perform conditional access operations.

FIG. 14 is an embodiment of a method 1400 for determining whether or not to perform conditional access operations. The method 1400 may be implemented using software, hardware, or a combination of software and hardware. In embodiments, the method 1400 may be performed by a device that is capable of connecting to a conditional access smartchip. In alternate embodiments, the method 1400 may be performed by a conditional access SoC. Flow begins at operation 1402, where negotiation is performed between the device or SoC performing the method 1400 (such as device 1204 in FIG. 12) and an external device connected to the device or SoC. In embodiments, operation 1402 may include the exchange of information that identifies whether or not device supports conditional access protocol and/or whether the supported conditional access protocols are the same. Flow continues to decision operation 1404 where, based upon the negotiation, a determination is made as to whether the connected device (e.g., a smartchip) supports a conditional access protocol. If the connected device does not support conditional access, or does not support the same conditional access protocol, then a determination is made that the connected device is not a smartchip or is otherwise incapable of performing conditional access. Upon making such a determination, flow branches NO to operation 1406 and communication with the external device are routed to a connector controller. In embodiments, the connector controller may be configured to perform operations according to a protocol based on the type of connector used (e.g., USB 2.0, USB 3.0, SCSI, IEEE 1394, etc.). Flow then continues to operation 1408 where operations are performed using the connector protocol. For example, if the connector is a USB 3.0 connector, operations may be performed in accordance with the USB 3.0 protocol at operation 1408.

Returning to decision operation 1404, if the device does support a conditional access protocol, flow branches YES to operation 1410. At operation 1410, communications with the external device may be routed to a conditional access controller (such as controller 1210 in FIG. 12). For example, communications with the external device may be routed to a Transport I/O controller. Flow then continues to operation 1412 where operations are performed according to the conditional access protocol. For example, at operation 1412, network encrypted content may be sent to the external device and locally encrypted content may be received from the external device.

Figure 15:
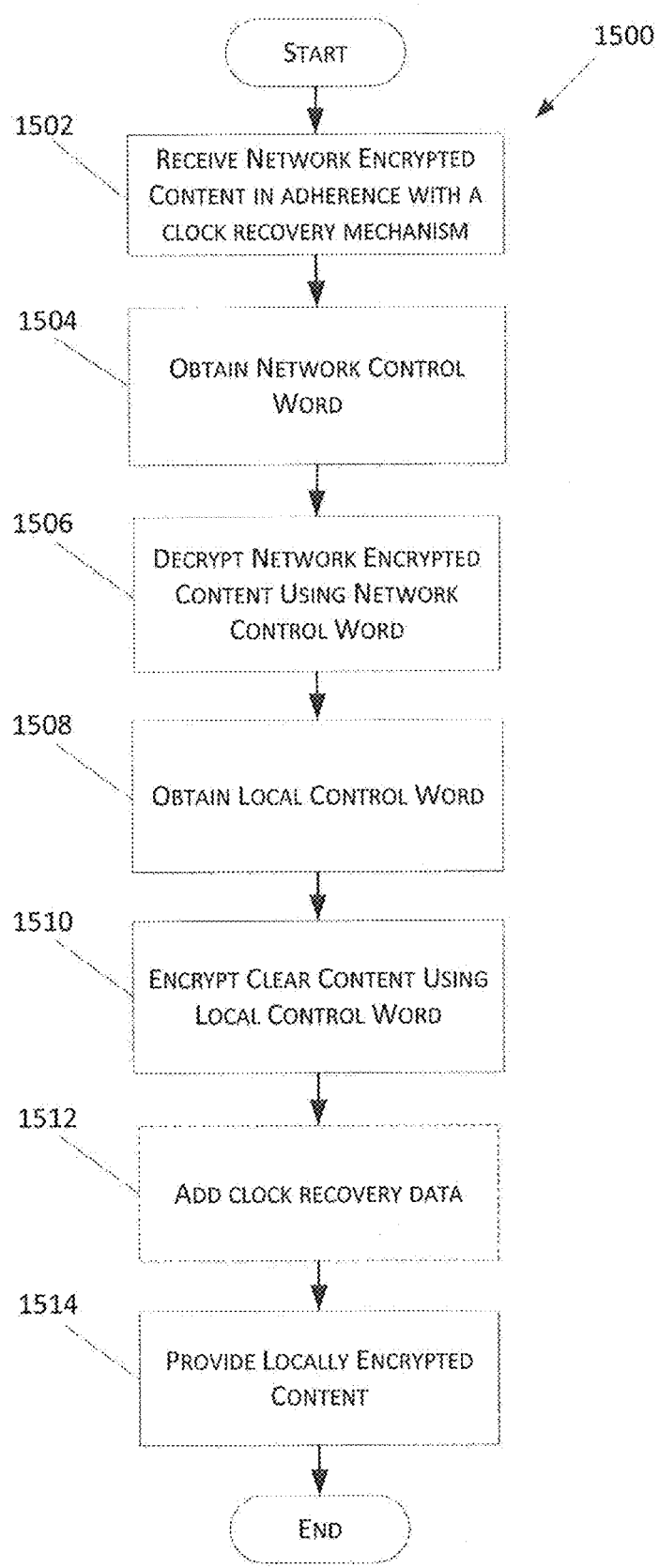
FIG. 15 is a flowchart representing an embodiment of a method 1500 of performing network content decryption via a standard connector.

FIG. 15 is a flowchart representing an embodiment of a method 1500 of performing network content decryption via a standard connector, such as, for example, a USB 3.0 connector. In embodiments, the method 1500 may be performed by a secure device or a secure processor. In further embodiments, the method 1500 may be performed by a smartchip, such as smartchip 1102 of FIG. 11. In embodiments, the method 1500 may be performed during operation 1312 of FIG. 13. The method 1500 may be implemented using software, hardware, or a combination of software and hardware. Flow begins at operation 1502 where the network encrypted content is received by the secure device. In embodiments, network secure content may be content encrypted using a NCW. The NCW may be a common control word or encryption key that is used to encrypt and decrypt content sent to multiple users or subscribers. In one embodiment, the network encrypted content may be a single stream of data. In alternate embodiments, the network encrypted content may contain multiple network encrypted streams, such as network encrypted elementary streams. Network encrypted elementary streams may be streams that contain audio data, video data, closed captioned data, or any other type of data. A network encrypted elementary stream may consist of compressed data from a single source, such as a particular network or channel. In embodiments where the network encrypted content may contain multiple network encrypted elementary streams, one or more network encrypted elementary streams may be individually received at operation 1502. However, in alternate embodiments, the network encrypted content comprising multiple network encrypted elementary streams may be received at operation 1502. In such embodiments, individual network streams may be filtered out, e.g., by performing PID filtering or other type of filtering, to isolate one or more individual network encrypted elementary streams at operation 1502.

As previously discussed, in embodiments, the connector may not have enough connection points (e.g., pins) to map to all of the pads of a Transport I/O smart card (e.g., smartcard 704 of FIG. 7). As such, the network encrypted content received at operation 1502 may be received in a format in accordance with a clock recovery mechanism. Different clock recovery mechanisms may be employed with the systems and methods disclosed herein. For example, embodiments disclosed herein may be practiced with different clock recovery mechanisms including, but not limited to, phase-locked looping, 8B/10B encoding, eight-to-fourteen modulation, or any other type of clock recovery technique known to the art. In some embodiments, clock recovery data may be included with the network encrypted content received at operation 1502. In embodiments, the type of clock recovery data included with the network encrypted content may be based upon the type of clock recovery mechanism employed. In embodiments, the clock recovery data received as part of the network encrypted content may be used by the device performing the method 1500, e.g., a smartchip, to synchronize communications.

Upon receiving the network encrypted content, flow continues to operation 1504 where the network control word is obtained. In one embodiment, the network control word may be a control word provided by the content supplier, such as, but not limited to, a head-end or a server transmitting the content. In embodiments, the network control word may be previously known by the device performing the method 1500. In another embodiment, the network control word may be received by the device. In such embodiments, the network control word may be encrypted, and operation 1504 may include decrypting the network control word. For example, in embodiments, the network control word may be obtained by decrypting an ECM that contains the network control word. The ECM may be decrypted using information from another message, such as an EMM. While the ECM and EMM messages are part of the DVB architecture, one of skill in the art will appreciate that other content delivery systems and architectures may be employed with the systems and methods disclosed herein.

Flow continues to operation 1506 where the network encrypted content (e.g., a network encrypted elementary stream or multiple network encrypted elementary streams) is decrypted using the network control word. In one embodiment, a single network control word may be used to decrypt the network encrypted content. In alternate embodiments, multiple control words may be used to decrypt the network encrypted content such as, for example, when the network encrypted content comprises multiple network encrypted elementary streams that have each been encrypted using a different network control word. In such embodiments, multiple network control words may be obtained at operation 1504 and then used to decrypt multiple network elementary streams at operation 1506. However, in other aspects, a single network control word may be used to encrypt multiple network elementary streams. In such embodiments, a single network control word may be used to decrypt the multiple network encrypted elementary streams. Decryption of the network encrypted content at operation 1506 may result in clear content, that is, content that is not protected by encryption. Because operations 1502-1506 may be performed by a secure device or secure processor, such as, but not limited to, a smart card and/or a smartchip, the network control word remains on the secure device. By maintaining the network control word on the device, an unauthorized subscriber cannot intercept the network control word that is transmitted between the smatchip and a device, such as a set-top-box, thereby impeding access to content by an unauthorized subscriber. In embodiments not shown in FIG. 15 the clear content may be provided by the secure processor (e.g., a smartchip) for display and/or storage after decryption step 1506. However, in the illustrated embodiment, an additional layer of protection may be added by performing local link encryption. In embodiments, local link encryption may comprise the re-encryption of the clear content using a local control word (LCW). The local control word may be an encryption key that is unique to a specific device. For example the LCW may be an encryption key that is only shared with the particular device (e.g., a television, computer, etc.) that the smartchip performing the method 1500 may be in communication with. In alternate embodiments, for example, when the secure processor is communicating with another type of device, such as, but not limited to, a smartphone, a laptop, a tablet, etc., the LCW may be an encryption key that is only shared with the particular device communicating with the secure processor. In embodiments, different types of encryption modes may be performed for local link encryption. In one embodiment, not all of the data representing the content may be encrypted using local link encryption. For example, transport mode encryption may be used. In embodiments transport mode encryption comprises a determination as to which bytes of data to encrypt based upon an MPEG2 transport encryption. In another embodiment, Bulk Mode encryption may be performed. In Bulk Mode encryption, all bytes representing the data may be encrypted during local link encryption. Bulk Mode encryption may be utilized to exchange data between devices in a secure manner. For example, Bulk Mode encryption may be used to mix transport input (e.g., content) with internal data that is used by the one or more components participating in encryption/decryption of content. In further embodiments, Bulk Mode encryption may be utilized to support other types of content streams that may provide additional features, such as Internet Protocol television (IPTV) content streams. Selection of the encryption mode may be based upon data that is present in the content or a data stream that includes the content. For example, one or more bits may be a part of or added to the clear content to identify an encryption mode to perform during local link encryption. Furthermore, in embodiments, the encryption algorithm performed during local link encryption may be compliant with the ATIS-08000006 standard. However, one of skill in the art will appreciate that any type of encryption algorithm may be used for local link encryption, so long as the same encryption algorithm is available on both the smartchip and the connected device. In embodiments, control packets defining the type of encryption may be transmitted to the secure device using different connections from the connections used to receive the network encrypted content. For example, if a USB 3.0 connector is used, then control packets may be sent using the USB 2.0 pins while network encrypted and locally encrypted content are streamed using the USB 3.0 pins.

In embodiments, a key setup used to select a key to be used for local link encryption may take place across security boundaries. For example, a key exchange may be made between a smartchip and a connected device as part of the key setup. An exchanged key may be generated by a secure device, such as a smartchip, and transmitted to a specific device that is communicating with the secure device. Because the local link encryption key is specific to a single device, and not a network transmission, interception of the local link encryption key does not provide an unauthorized user the ability to globally access the broadcasted network content. In embodiments, multiple keys may be used for local link encryption. For example, a smartchip may be able to simultaneously process multiple input streams and output multiple locally encrypted streams. In such embodiments, each locally encrypted stream may be encrypted using a unique local link encryption key. However, in other embodiments, the same local link encryption key may be used to encrypt each of the locally encrypted streams. In embodiments, the key exchange may be transmitted using different connections from the connections used to receive the network encrypted content. For example, if a USB 3.0 connector is used, then the USB 2.0 pins may be utilized for key exchange while network encrypted and locally encrypted content are streamed using the USB 3.0 pins.

Flow continues to operation 1508 where a local control word is obtained. A local control word may be any type of encryption key. In embodiments, the local control word may be an encryption key that is specific to a target device. In embodiments, the local control word may be obtained from ordinary software registers, a hardware key ladder, a random key generator, or from any other source. In one embodiment, the local control word may be dynamically generated and shared with a recipient device. In such embodiments, the key may be generated based upon characteristics of the device. In embodiment, multiple keys may be selected during obtain operation 1508. For example, two keys may be selected from a key ladder. A key ladder may store or otherwise identify a plurality of interrelated keys. In embodiments, any type of encryption key or keys, e.g., fixed encryption keys, dynamic encryption keys, randomly generated encryption keys, etc. may be employed with the embodiments disclosed herein.

After obtaining the local control word, flow continues to operation 1510 where the network decrypted content is re-encrypted using the local control word to generate locally encrypted content. As was previously discussed, different types of encryption modes and encryption algorithms may be used to encrypt the content at operation 1510. In an embodiment, the encryption may be based upon the key obtained at operation 1508. In embodiments where multiple keys are obtained, one of the keys may be selected and used during encryption at operation 1510. For example, an appropriate key may be selected based upon an identifier in the content. The identifier may be part of the content or may be added to the content or a header associated with the content as it is processed during the method 1500. The identifier may be a single bit that identifies an even or an odd key (in embodiments where two keys are obtained). This identifier provides for the automatic selection of a key for use during the encryption process at operation 1510.

In further embodiments, in addition to encrypting the content, the size of the content may be increased. It may be beneficial to increase the size of the content in order to make it more difficult for the content to be shared over a network. For example, increasing the content size will require greater bandwidth to properly share the content with unauthorized users over a network. For example, data may be added to a broadcast stream to make it more difficult to process or share with unauthorized users. In embodiments where the content is streamed (e.g., audio and/or video content) non-content data packets may be added to the content stream and the bandwidth rates may be increased. The increase in bandwidth and the addition of non-content data provides additional security for the content when it leaves the secure device and/or secure processor that performs the method 1500 by making the content more difficult to share and process. Further details regarding stream expansion are provided in U.S. Pat. No. 8,385,542 entitled, "Methods and Apparatus for Securing Communications Between a Decryption Device and a Television Receiver," filed on Apr. 27, 2009, which is hereby incorporated by reference in its entirety.

In embodiments, flow continues to optional operation 1512 where clock recovery data is added to the locally encrypted content. In embodiments, the type of clock recovery data included with the network encrypted content may be based upon the type of clock recovery mechanism employed. For example, embodiments disclosed herein may be practiced with different clock recovery mechanisms including, but not limited to, phase-locked looping, 8B/10B encoding, eight-to-fourteen modulation, or any other type of clock recovery technique known to the art. Operation 1512 may be optional because some clock recovery mechanisms do not require the addition of clock recovery data (e.g., phase-locked looping). In such embodiments, the data may be provided in accordance with the selected clock recovery mechanism at operation 1514.

While the embodiment of the method 1500 is illustrated as decrypting the network encrypted content, subsequently locally encrypting the decrypted network encrypted content, and then adding clock recovery data as three distinct operations, one of skill in the art will appreciate that, in embodiments, the decryption, encryption, and/or addition of clock recovery data may be performed sequentially, performed as a single operation, as two operations, or performed in parallel. In embodiments, a person of skill in the art will appreciate that stream expansion may also be performed in the single decryption/encryption operation. As such, one of skill in the art will appreciate that the method described with respect to FIG. 15 may be performed using fewer or more operations than are illustrated herein.

In further embodiments, the method 1500 may operate on stream data. In such embodiments, a network encrypted stream may be received at operation 1502, a clear content stream may be generated by decrypting the network encrypted stream at operation 1504, and a locally encrypted stream may be generated at operation 1512. One of skill in the art will appreciate that the embodiments disclosed herein with respect to FIG. 15 may operate on stream data as well as data transmitted in any other form.

Further to the embodiment illustrated by FIG. 15, after performing the local encryption, flow continues to operation 1514 where the locally encrypted content, with the clock recovery data, is provided to another device. For example, a smartchip may provide the locally encrypted content with clock recovery data to a conditional access SoC, a smartphone, a laptop, a tablet, or any other device connected to or otherwise in communication with a smartchip at operation 1514. Furthermore, inclusion of the clock recovery data may allow for synchronization of communication between the secure processor performing the method 1500 and another device when the connector does not provide for transmitting clock signals. In a general computing device, the locally encrypted content may be provided from a secure processor (e.g., a smartchip) to a general processor and/or unprotected memory for storage and/or display at operation 1514. One of skill in the art will appreciate that the method 1500 provides a solution to the problems described herein by providing locally encrypted content to unsecure components as opposed to providing a control word or encryption key as is generally performed by devices and systems that do not support embodiments of a Transport I/O system as described herein. Furthermore, one of skill in the art will appreciate that the weakest security leak in such content protection systems may occur when data is transmitted from a secure device and/or processor to a general device. However, embodiments disclosed herein address this weakness by providing locally encrypted content and, optionally, content that has its data and bandwidth expanded, thereby making it harder for an unauthorized user to process, share, and access the content even if it is intercepted as it is transmitted within the secure device and/or processor system/architecture.

In one embodiment, the locally encrypted content may be provided as individual locally encrypted elementary streams. For example, in embodiment where multiple network encrypted elementary streams are received and decrypted, the multiple elementary streams may be individually encrypted and returned as individual locally encrypted elementary streams. In such embodiments, each stream may include clock recovery data. In an alternate embodiment, the multiple network encrypted elementary streams may be multiplexed into a single output stream. In such embodiments, the single output stream may be locally encrypted and then provided at operation 1514. The single output stream may include clock recovery data. In embodiments, multiple elementary streams may be multiplexed into a single output stream prior to the local encryption performed at operation 1510 or after the local encryption operation 1510.

Figure 16:
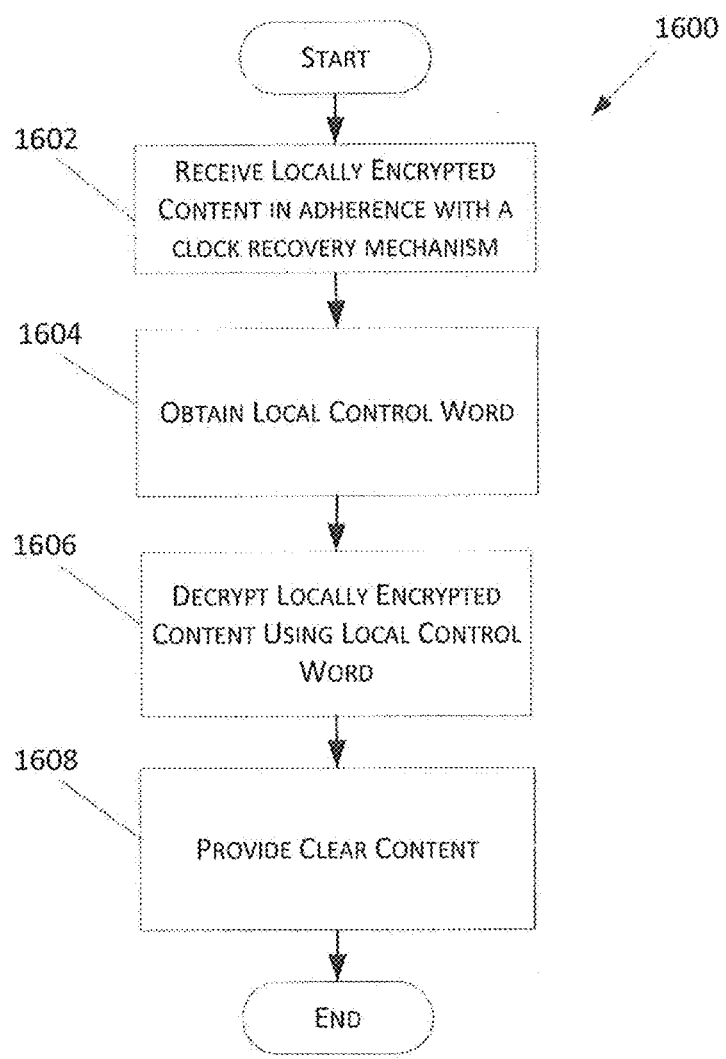
FIG. 16 is an embodiment of a method 1600 for processing locally encrypted content received via a connector.

FIG. 16 is an embodiment of a method 1600 for processing locally encrypted content received via a connector, such as, for example, a USB 3.0 connector. In embodiments, the method 1600 may be performed by a device such as a set-top-box, a laptop computer, a tablet computer, a smartphone, a television, or any other type of general computing device. In embodiments, the method 1600 may be performed during operation 1412 of FIG. 14. The method 1600 may be implemented using software, hardware, or a combination of software and hardware. Flow begins at operation 1602 where the locally encrypted content is received. In embodiments, the locally encrypted content may be received from a secure device such as a secure processor and/or smartchip that performed the method 1500 described with respect to FIG. 15. For example, in a non-limiting embodiment, the locally encrypted content may be received from a smartchip that is in communication with a device via a connector, such as, for example, a USB 3.0 connector.

As previously discussed, in embodiments, the connector between a secure device, such as a smartchip, and the device performing the method 1600 may not have enough connection points (e.g., pins) to map to all of the pads of a Transport I/O smart card (e.g., smartcard 704 of FIG. 7). As such, the locally encrypted content received at operation 1602 may be received in a format in accordance with a clock recovery mechanism. Different clock recovery mechanisms may be employed with the systems and methods disclosed herein. For example, embodiments disclosed herein may be practiced with different clock recovery mechanisms including, but not limited to, phase-locked looping, 8B/10B encoding, eight-to-fourteen modulation, or any other type of clock recovery technique known to the art. In some embodiments, clock recovery data may be included with the network encrypted content received at operation 1602. In embodiments, the type of clock recovery data included with the network encrypted content may be based upon the type of clock recovery mechanism employed. In embodiments, the clock recovery data received as part of the network encrypted content may be used by the device performing the method 1600, e.g., a conditional access SoC, smartphone, laptop, etc., to synchronize communications.

Upon receiving the locally encrypted content with the clock recovery data, flow continues to operation 1604 where a local control word is obtained. A local control word may be any type of encryption key. In embodiments, the local control word may be an encryption key that is specific to the device performing the method 1600. In embodiments, the local control word may be obtained from the smartchip using ordinary software registers, a hardware key ladder, a random key generator, or from any other source unique to the device. In one embodiment, the local control word may be received from the secure device (such as a smartchip and/or processor performing the method 1500). In such embodiments, the local control word may be received via another connection. For example, the local control word may be received via different connections (e.g., different pins) from the connections used to receive the locally encrypted content. For example, if a USB 3.0 connector is used, then the USB 2.0 pins may be utilized for local control word exchange while network encrypted and locally encrypted content are streamed using the USB 3.0 pins.

In another embodiment, the local control word may be generated by the device performing the method 1600. In such embodiments, the local control word may have been previously shared with a secure processing device, smartchip, and/or secure processor that created the locally encrypted content received at operation 1602. The local control word may be randomly generated. In embodiments, a single local control word may be used. In other embodiments, multiple local control words may be used. In such embodiments, the local control word may change periodically such that a local control word is discarded for a new local control word after a set period of time.

Flow continues to operation 1606 where the locally encrypted content is decrypted using the local control word. Decryption of the locally encrypted content may produce content in the clear that is accessible by an application. One of skill in the art will appreciate that many type(s) of encryption mode(s) and/or algorithm(s) may be employed to decrypt the locally encrypted content. As such, a type of decryption algorithm may be employed at operation 1606 to decrypt the content using the local control word. Furthermore, the device performing the decryption may be capable of handling and processing the locally encrypted content despite the increased bandwidth of the locally encrypted content due to non-content data. In such embodiments, decryption of the locally encrypted content at operation 1606 may include identifying and removing non-content data from the content. In another embodiment, removal of the non-content data may not take place until the clear content is processed for display or storage. The device performing the method 1600 may also utilize the clock recovery data when decrypting the locally encrypted content at operation 1606.

Flow continues to operation 1608 where the clear content is provided. In one embodiment, providing the clear content may include decoding, displaying and or otherwise playing the clear content. For example, the clear content may be displayed on a television, monitor, and or display that may be part of the device or in communication with the device performing the method 1600. In another embodiment, providing the clear content may include storing the clear content in data storage that may be part of the device or connected to the device performing the method 1600.

In an alternate embodiment, persistent encryption may be performed by not immediately decrypting the locally encrypted content as described in FIG. 16. In such embodiments, persistent encryption may be utilized on content, such as MPEG Transport Packets received from a broadcasted network transmission. In such embodiments, a secure device may still perform network decryption and local link encryption as described in FIG. 1500; however, the device that receives the locally encrypted content may not immediately perform local link decryption. Instead, the device receiving the locally encrypted content may store the locally encrypted content, as it is encrypted, for later use. This allows the content to be encrypted for secure local storage, but the secure device can still control when the content is decrypted by, for example, providing a decryption key at a later time.

Figure 17:
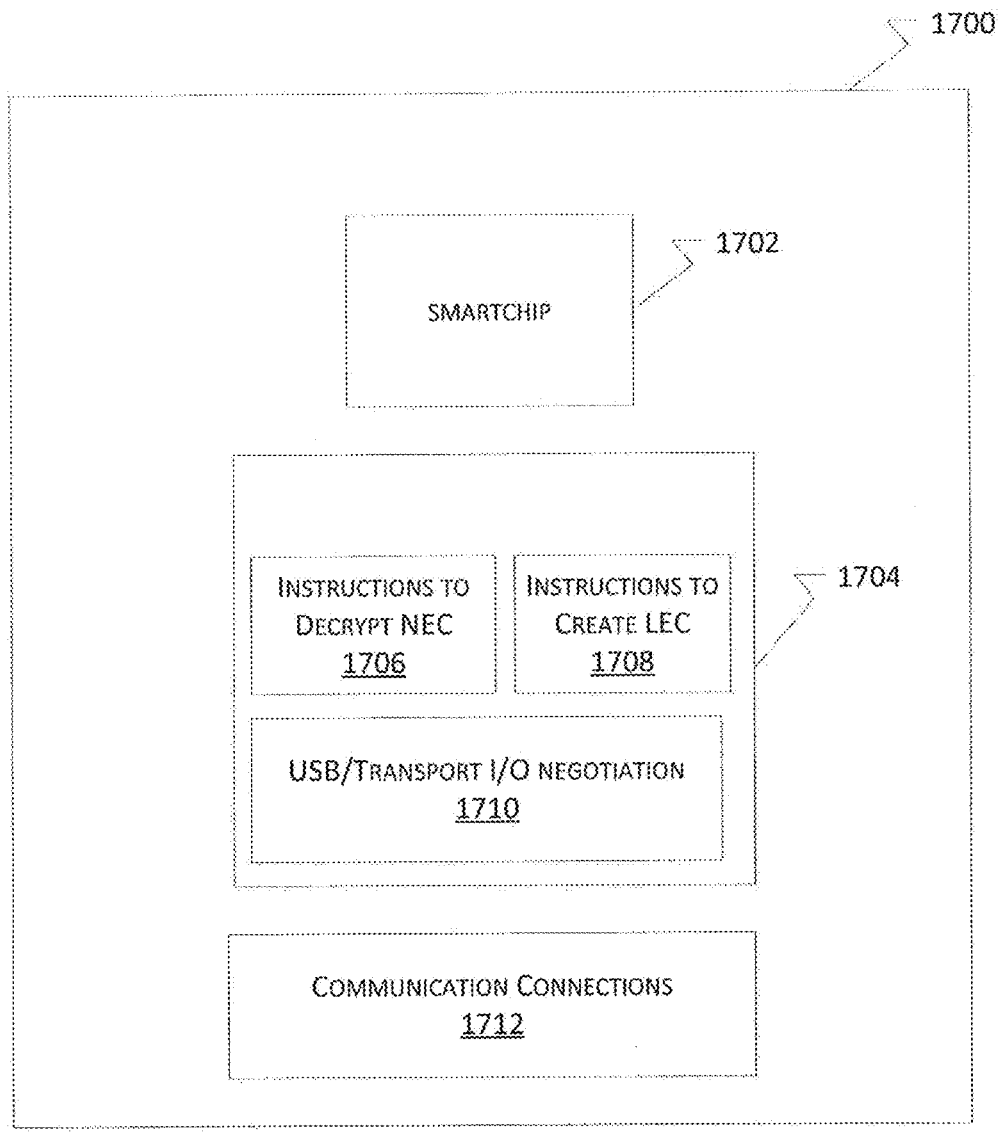
FIG. 17 is an embodiment of a secure processing device 1700.

FIG. 17 is an embodiment of a secure processing device 1700 that may be employed with the systems or to perform the methods disclosed herein. In embodiments, the secure processing device may be a smartchip. However, one of skill in the art will appreciate that any other type of secure device may be employed with the systems and methods disclosed herein. In embodiments, the secure processing device 1700 may be connected to a device performing the method 400 described with respect to FIG. 4. In another embodiment, the secure processing device 1700 may be a removable component of a device performing the method 400. In embodiments, the secure processing device 1700 may perform the method 1300 described with respect to FIG. 13. In further embodiments, the secure processing device 1700 may perform the method 1500 described with respect to FIG. 15.

In embodiments, secure processing device 1700 includes one or more smartchips 1702. The one or more smartchips may include one or more processing units. In some embodiments, one or more components of the methods described herein are performed by the one or more smartchips 1702. For example, the one or more smartchips 1702 may be used to decrypt network encrypted content, create locally encrypted content, and create non-content data as described in the method 1500 of FIG. 15.

Secure processing device 1700 may also include memory 1704. Memory 1704 includes, computer storage media such as, but not limited to, RAM, ROM, EEPROM, flash memory or other memory technology, or any other non-transitory medium which is used to store information and which is accessed by secure processing device 1700 and one or more processing units 1702. Memory 1704 may store executable instructions to perform the methods disclosed herein. For example, memory 1704 may include instructions to decrypt network encrypted content (NEC) 1706. Memory may also store the instructions to encrypt clear content to create locally encrypted content (LEC) 1708. Furthermore, the memory 1704 may include instructions to perform a USB/Transport I/O negotiation 1710 as described herein. Furthermore, the USB/Transport I/O negotiation instructions 1710 may include instructions to configure a connection (e.g., reconfigure pins in a USB 3.0 connector) based upon the negotiation.

Secure processing device 1700 may also contain communications connection(s) 1712 that allow the device to communicate with other devices. Communications connection(s) 1712 may include standard connectors, such as a USB 2.0 connector, a USB 3.0 connector, a SCSI connector, an IEEE 1394 connector, etc. Communication connection(s) 1710 may be used to transmit communication media. Communication media may embody a modulated data signal, such as a carrier wave or other transport mechanism and includes any information delivery media, which may embody computer readable instructions, data structures, program modules, or other data in a modulated data signal. The term "modulated data signal" means a signal that has one or more of its characteristics set or changed in such a manner as to encode information or a message in the data signal. By way of example, and not limitation, communication media includes wired media such as a wired network or direct-wired connection, and wireless media such as an acoustic, RF, infrared, and other wireless media. In embodiments, network encrypted content such may be received over communications connection(s) 1712. Locally encrypted content may be transmitted over communications connection(s) 1712. In still further embodiments, the instructions to perform the Transport I/O methods described herein may be received via communications connection(s) 1712. For example, a head-end may update secure processing device 1700 with instructions to perform the methods disclosed herein. The instructions may be stored in memory 1704. Communications connection(s) 1710 thereby allows a head-end to update secure devices deployed in the field with instructions to perform the methods disclosed herein. Communications connections also provide the secure processing device 1700 with the ability to receive network encrypted content from a device and return locally encrypted content to the device.

Although the embodiment of the secure processing device 1700 is illustrated as having memory 1704 that includes instructions to perform the methods disclosed herein, in alternate embodiments, the instructions to perform the methods disclosed herein may be performed by an application specific integrated circuit (ASIC) that is part of the secure processing device 1700.

The embodiments disclosed herein provide systems, methods, and devices for performing conditional access, such as the Transport I/O embodiments disclosed herein, using common connectors found on many different devices, such as a USB 3.0 connector. While specific embodiments have been disclosed herein, one of skill in the art will appreciate that other methods may be employed to perform conditional access using a common connector without departing from the spirit of this disclosure. For example, the USB 3.0 protocol stack may be used as-is to encapsulate data packets that include command and control data, reset data, network encrypted content, and/or locally encrypted content.

The embodiments described herein may be employed using software, hardware, or a combination of software and hardware to implement and perform the systems and methods disclosed herein. Although specific devices have been recited throughout the disclosure as performing specific functions, one of skill in the art will appreciate that these devices are provided for illustrative purposes, and other devices may be employed to perform the functionality disclosed herein without departing from the scope of the disclosure.

This disclosure described some embodiments of the present invention with reference to the accompanying drawings, in which only some of the possible embodiments were shown. Other aspects may, however, be embodied in many different forms and should not be construed as limited to the embodiments set forth herein. Rather, these embodiments were provided so that this disclosure was thorough and complete and fully conveyed the scope of the possible embodiments to those skilled in the art.

Although specific embodiments were described herein, the scope of the invention is not limited to those specific embodiments. One skilled in the art will recognize other embodiments or improvements that are within the scope and spirit of the present invention. Therefore, the specific structure, acts, or media are disclosed only as illustrative embodiments. The scope of the invention is defined by the following claims and any equivalents therein.

What is claimed is:

1. A removable security device for performing a method comprising:
   receiving a first network encrypted elementary stream, wherein the first network encrypted elementary stream is received in a format in accordance with a first clock recovery mechanism;
   receiving a second network encrypted elementary stream, wherein the second network encrypted elementary stream is received in a format in accordance with the first clock recovery mechanism;
   decrypting the first and second network encrypted elementary streams using at least one network control word to generate first and second clear content streams, wherein decrypting the first and second network encrypted elementary streams is based at least in part on the first clock recovery mechanism;
   obtaining at least one local control word;
   encrypting the first and second clear content streams to produce first and second locally encrypted content streams, wherein the first and second locally encrypted content streams are generated using the at least one local control word;
   multiplexing the first and second locally encrypted content streams into an output stream;
   providing, to a video processing device, the output stream, wherein the output stream is provided in accordance with the first clock recovery mechanism.

2. The removable security device of claim 1, wherein the removable security device is a smartchip.

3. The removable security device of claim 1, wherein the removable security device comprises a USB 3.0 connector.

4. The removable security device of claim 3, wherein the method further comprises:
   configuring a Receive− pin as an SC_out− interface;
   configuring a Receive+ pin as an SC_out+ interface;
   configuring a Transmit− pin as an SC_IN− interface; and
   configuring a Transmit+ pin as an SC_IN+ interface.

5. The removable security device of claim 1, wherein encrypting the first and second clear content streams utilizes a transport mode encryption.

6. The removable security device of claim 1, wherein encrypting the first and second clear content streams utilizes a bulk mode encryption.

7. The removable security device of claim 1, wherein the removable security device and the video processing device communicate using LVDS.

8. The removable security device of claim 1, wherein the at least one local control word is generated by the removable security device.

9. The removable security device of claim 1, further comprising:
   obtaining a first local control word, wherein the first clear content stream is encrypted using the first local control word; and
   obtaining optional additional local control word(s), wherein optional additional network content stream(s) are encrypted using the optional additional local control word(s), and wherein some or all of the local control words are different.

10. A computer storage medium not consisting of a propagated data signal encoding computer executable instructions that, when executed by at least one processor, perform a method comprising:
    receiving a first network encrypted elementary stream, wherein the first network encrypted elementary stream is in a format in accordance with a first clock recovery data;
    receiving a second network encrypted elementary stream, wherein the second network encrypted elementary stream is in a format in accordance with a second clock recovery data;
    decrypting the first and second network encrypted elementary streams using at least one network control word to generate first and second clear content streams, wherein decrypting the first and second network encrypted elementary streams is based at least in part on the first and second clock recovery data;
    obtaining at least one local control word;
    encrypting the first and second clear content streams to produce first and second locally encrypted content streams, wherein the first and second locally encrypted content streams are generated using the at least one local control word;
    multiplexing the first and second locally encrypted content streams into an output stream;
    adding third clock recovery data to the output stream; and
    providing, to a video processing device, the output stream.

11. The computer storage medium of claim 10, wherein a first network control word is used to decrypt the first network encrypted elementary stream using the first clock recovery data and second network control word is used to decrypt the second network encrypted elementary stream using the second clock recovery data, and wherein the first and second network control words are different.

12. The computer storage medium of claim 10, wherein the at least one local control word is generated by the removable security device.

13. The computer storage medium of claim 10, wherein the method further comprises:
    obtaining a first local control word, wherein the first clear content stream is encrypted using the first local control word; and
    obtaining optional additional local control word(s), wherein optional additional network content stream(s) are encrypted using the optional additional local control word(s), and wherein some or all of the local control words are different.

14. The computer storage medium of claim 10, wherein the output stream is provided via a connector.

15. The computer storage medium of claim 14, wherein the connector is a USB 3.0 connector.

16. The removable security device of claim 1, wherein the first clock recovery mechanism comprises at least one of: phase-locked looping, 8B/10B encoding and eight-to-fourteen modulation.

17. The removable security device of claim 1, wherein the method further comprises:
    adding clock recovery data to at least one of the first and second locally encrypted content streams.

18. The removable security device of claim 17, wherein a data type of the added clock recovery data is based on a mechanism type of the first clock recovery mechanism.

19. A method of performing content decryption, the method comprising:
    receiving a first network encrypted elementary stream, wherein the first network encrypted elementary stream is received is in a format in accordance with a first clock recovery mechanism;

receiving a second network encrypted elementary stream, wherein the second network encrypted elementary stream is received is in a format in accordance with the first clock recovery mechanism;

decrypting the first and second network encrypted elementary streams using at least one network control word to generate first and second clear content streams, wherein decrypting the first and second network encrypted elementary streams is based at least in part on the first clock recovery mechanism;

obtaining at least one local control word;

encrypting the first and second clear content streams to produce first and second locally encrypted content streams, wherein the first and second locally encrypted content streams are generated using the at least one local control word;

multiplexing the first and second locally encrypted content streams into an output stream;

providing, to a video processing device, the output stream, wherein the output stream is provided in accordance with the first clock recovery mechanism.

20. The method of claim 19, wherein the first network encrypted elementary stream comprises first clock recovery data and the second network encrypted elementary stream comprises second clock recovery data.

* * * * *